(12) United States Patent
Baxter

(10) Patent No.: US 8,670,880 B2
(45) Date of Patent: Mar. 11, 2014

(54) AVIATION YOKE HSI INTERFACE AND FLIGHT DECK CONTROL INDICATOR AND SELECTOR SAFETY SYSTEM

(76) Inventor: Stephen Baxter, Kettering, OH (US)

( * ) Notice: Subject to any disclaimer, the term of this patent is extended or adjusted under 35 U.S.C. 154(b) by 0 days.

(21) Appl. No.: 13/103,140

(22) Filed: May 9, 2011

(65) Prior Publication Data

US 2011/0213514 A1 Sep. 1, 2011

Related U.S. Application Data

(63) Continuation-in-part of application No. 12/904,202, filed on Oct. 14, 2010, now Pat. No. 7,957,852, which is a continuation of application No. 11/604,523, filed on Nov. 27, 2006, now Pat. No. 7,840,315.

(51) Int. Cl.
*G05D 1/00* (2006.01)
*G06F 19/00* (2011.01)

(52) U.S. Cl.
USPC .............................. 701/14; 440/97; 340/975

(58) Field of Classification Search
USPC .......................................... 403/975
See application file for complete search history.

(56) References Cited

U.S. PATENT DOCUMENTS

| | | | |
|---|---|---|---|
| 4,438,425 A | 3/1984 | Tsuchida et al. | |
| 4,672,214 A | 6/1987 | Takahashi et al. | |
| 5,042,314 A | 8/1991 | Rytter et al. | |
| 5,721,541 A | 2/1998 | Repp et al. | |
| 5,797,562 A * | 8/1998 | Wyatt | 244/1 R |
| 5,903,227 A * | 5/1999 | Scheuer | 340/945 |
| 5,978,715 A * | 11/1999 | Briffe et al. | 701/11 |
| 5,979,715 A * | 11/1999 | Emrick | 222/464.4 |
| 6,112,141 A * | 8/2000 | Briffe et al. | 701/14 |
| 6,405,107 B1 * | 6/2002 | Derman | 701/3 |
| 6,437,739 B1 | 8/2002 | Schulte et al. | |
| 6,626,062 B1 * | 9/2003 | Yoshitake et al. | 74/552 |
| 6,842,672 B1 | 1/2005 | Straub et al. | |
| 7,215,256 B2 | 5/2007 | Reusser et al. | |
| 7,840,315 B2 | 11/2010 | Baxter | |
| 2003/0179109 A1 * | 9/2003 | Chamas et al. | 340/973 |
| 2005/0200502 A1 | 9/2005 | Reusser et al. | |
| 2006/0041345 A1 * | 2/2006 | Metcalf | 701/33 |
| 2010/0156674 A1 * | 6/2010 | Dwyer et al. | 340/975 |

* cited by examiner

*Primary Examiner* — John R Olszewski
*Assistant Examiner* — Jean-Paul Cass
(74) *Attorney, Agent, or Firm* — David J. Dawsey; Michael J. Gallagher; Gallagher & Dawsey Co., LPA

(57) ABSTRACT

An aviation yoke HSI interface and flight deck control indicator and selector safety system enhances flight safety. The system incorporates a multi-controlled HSI with a yoke heading adjustment control, a yoke radial/course selector, and a yoke heading centering control positioned on a yoke, stick, or collective. The system may also incorporate a first officer multi-controlled HSI with a first officer yoke heading adjustment control, a first officer yoke radial/course selector, and a first officer yoke heading and course centering control. An autopilot mode indicator visually indicates whether an autopilot is flying according to a desired heading or according to a navigational aid signal, such as a VOR radial signal. A side selector-indicator control permits selection of which side controls the flight of the aircraft.

17 Claims, 10 Drawing Sheets

AVIATION YOKE HSI INTERFACE AND FLIGHT DECK CONTROL INDICATOR AND SELECTOR SAFETY SYSTEM

CROSS REFERENCE TO RELATED APPLICATIONS

This application is a continuation-in-part of U.S. patent application Ser. No. 12/904,202, filed on Oct. 14, 2010 now U.S. Pat. No. 7,957,852, which is a continuation of U.S. patent application Ser. No. 11/604,523, now U.S. Pat. No. 7,840,315, filed on Nov. 27, 2006, the content of which is hereby incorporated by reference in its entirety.

TECHNICAL FIELD

The instant invention relates to an aviation yoke, stick, or collective with HSI controls and flight deck control indicator and selector safety system, and, more particularly, relates to a system for allowing a pilot to change a heading and select a course on an HSI while grasping a yoke, stick, or collective, and a selector and indicator system for quickly determining which seat has control of an aircraft.

BACKGROUND OF THE INVENTION

Like other modes of transportation, flying is dangerous. Unlike other modes of transportation, aircraft are capable of traveling at relatively high speed at great altitude. Thus, unlike other modes of transportation, extensive training is required before one may safely pilot an aircraft. A large portion of a pilot's training is the safe navigation of the aircraft from one location to another. After all, to transport people or things requires the ability to ascertain the current location of the aircraft with respect to the destination.

The navigation process begins prior to departure. The pilot determines the most appropriate flight path from the current location, taking into account factors such as weight of the aircraft, fuel required, weather conditions between the departure and arrival location. During the flight, the pilot records the progress of the flight against the flight plan. This exercise helps identify potential problems prior to those problems becoming emergencies. The pilot may use two basic methods for navigating an aircraft.

The first basic navigation method is according to VFR, or Visual Flight Rules. The second is IFR, or Instrument Flight Rules. While flying according to the IFR, many instruments on a flight deck of an aircraft are used. One of the primary navigational aids that the pilot uses to determine whether the aircraft is on the planned flight path is a HSI, or Horizontal Situation Indicator.

The HSI provides a visualization of the position of the aircraft with respect to a multitude of navigational sources that can be displayed on an electronic or mechanical HSI. For years the VOR has been the primary source of aircraft navigation using an HSI. The VOR (VHF Omnidirectional Radio Range) radial signal broadcast by a VOR station, which are known in the art. The HSI also has a compass, or simulated electronic compass, integrated into it that displays the direction that the plane is headed with regard to the earth's magnetic field. For one skilled in the art it is understood that any reference to compass herein also includes simulated compasses such would appear on an electronic display or projected image. Further, one skilled in the art will understand that a full compass need not be displayed at all times. In fact, only a portion of the compass may be displayed at any one time in what is referred to as "arc mode." The heading of the aircraft is determined with the compass. In the past, to successfully navigate through the "airways in the sky," the pilot tunes into desired frequencies broadcast from a VOR station. Each VOR station has a unique frequency that it broadcasts two 30 Hz reference signals to encode direction to and from the VOR station along VOR radials. By tuning into the VOR station frequency, for instance located at an airport, and decoding the phase difference between the two 30 Hz signals a representation of any one of the radials may be displayed on the HSI. Thus, the HSI provides visual and numerical information of where the aircraft is relative to the VOR radial that the pilot desires to use.

During flight, the pilot, in part, monitors the HSI to verify the location of the aircraft against the flight plan. Also during flight, the desired heading and the VOR radials may be changed or adjusted multiple times, depending on the length of the trip, to guide the aircraft from one VOR radial signal to a next VOR radial signal along the scheduled flight path. The HSI generally has two controls on its face. A heading select knob controls the position of a heading select bug which indicates the desired heading of the aircraft. A course select knob is used to select the VOR radial.

With advancement in technology aircraft are using many different sources for navigation that are displayed on the HSI. In the art it is commonly known that an HSI can be used to navigate with various sources of navigational equipment including but not limited to the following systems which will be referred to throughout as simply "navigational aid": the VOR as previously discussed: LOC (localizer); LDA (Localizer Type Directional Aid); TACAN (Tactical Air Navigation); VORTAC (VHF Omni-Directional Tactical Air Navigation); GPS (Global Positioning System); INS (Inertial Navigation System); FMS (Flight Management System); MLS (Microwave Landing System); LORAN (Long Range Navigation-C); IRU (Internal Reference Units); WAAS (Wide Augmentation System); GLS (Global Landing System); and TLS (Transponder Landing System), all terms known to one skilled in the art and as described in the Federal Aviation Administration (FAA) Aeronautical Information Manual (AIM). Some of these navigational aids are transmitted from ground based stations such as conventional VOR stations, others from satellites, and others are internal to the aircraft such as gyro based systems. To navigate using these navigational aids the pilot will adjust the OBS (Omni-Bearing Selector) to the desired radial or for the desired course. Some of the afore mentioned navigational sources will automatically set the OBS for the desired course, however some just indicate a suggested course that the pilot must then set. All of these navigational sources will be displayed on the CDI (Course Deviation Indicator) on the HSI. These sources will automatically set the CDI on the HSI to a predetermined course that the pilot has selected and or entered, but some may require the pilot to do this manually. The CDI will show the course on the HSI in respect to the navigational radial or course to be flown. This radial will be a magnetic heading as displayed on the HSI.

Since heading select knob and the course select knob are generally located on a front face of the HSI, or in some other remote location, the pilot must release one hand from the yoke or a throttle, power levers, or the collective in helicopter and grasp and rotate the knob to make the adjustment. Releasing the yoke creates safety issues in at least two situations. The first situation occurs when flying into or out of high density traffic areas. In high density traffic areas, where there are many other aircraft in the vicinity, quickly identifying potential collision courses and taking immediate evasive action may be the difference between a near miss and a collision. The second situation occurs in bad weather where the pilot may have difficulty adjusting the aircraft's attitude in response to external forces. Again, releasing the hand from the yoke to make an adjustment to the HSI creates safety problems and may cause spatial disorientation. Both situations are aggravated by darkness when flying according to IFR. To make matters worse, if there is only a single pilot, making a landing approach in bad weather or in darkness is a safety hazard not only for the pilot and passengers, but for the people on the ground. In all of these situations maximizing control of the aircraft by keeping one hand on a yoke and the other on the throttle(s) or power lever(s), or cyclic and collective in the case of helicopters, is preferable. However, it is often necessary to adjust the heading and select a new course on the HSI while flying under these conditions. So, the pilot will often risk spatial disorientation or losing control of the aircraft by flying with one hand off of either control to make a heading or a course adjustment.

Fortunately, many aircraft have two seats, the captain's seat, and the first officer's or right seat. Each seat has its own set of flight controls complimented by similar gages. The purpose of multiple seats with multiple flight controls is improve safety by providing at least one redundant set of controls and instruments in case of the failure of the primary set. However, the captain's controls generally do not interact with the first officer's controls, meaning that little, if any, information is exchanged between the two. Therefore, in the severe weather and high density traffic situations discussed above, the pilot sitting in the captain's seat is in sole control of the aircraft, even if another pilot is sitting in the first officer's seat. In other words, the first officer is unable to help fly the aircraft even if the captain made a request for help.

What has been missing in the art has been a system by which the pilot may maintain a firm grip on the yoke, however, a system which allows the pilot to adjust the heading and the course of the aircraft while at the same time gripping the flight controls. In addition, the prior art is missing a system that allows one pilot to transfer part of the navigation responsibilities to the other pilot. Furthermore, the art has been missing a system where the pilot may quickly assess which set of instruments has control of the aircraft.

SUMMARY OF INVENTION

In its most general configuration, the present invention advances the state of the art with a variety of new capabilities and overcomes many of the shortcomings of prior devices in new and novel ways. In its most general sense, the present invention overcomes the shortcomings and limitations of the prior art in any of a number of generally effective configurations. The instant invention demonstrates such capabilities and overcomes many of the shortcomings of prior methods in new and novel ways.

In one embodiment of the aviation yoke HSI interface and flight deck control indicator and selector safety system, a pilot may sit in a captain's seat on a flight deck of an aircraft. The pilot may grip a captain yoke to adjust the altitude and attitude of the aircraft. An instrument panel contains a plurality of instruments for displaying flight critical information. A multi-controlled HSI is also located on the instrument panel.

The multi-controlled HSI has a compass, or simulated compass, that visually indicates an orientation of the earth's magnetic field. The compass has a compass perimeter and a plurality of radial measurement indicia that are located along the compass perimeter. For one skilled in the art it is understood that any reference to compass herein also includes simulated compasses such would appear on an electronic display or projected image. Further, one skilled in the art will understand that a full compass need not be displayed at all times. In fact, only a portion of the compass may be displayed at any one time in what is referred to as "arc mode." An actual heading of the aircraft is determined by the alignment of a heading indicator to the radial measurement indicia.

The multi-controlled HSI has an adjustable heading bug. The adjustable heading bug is in operable communication with a heading adjustment control. The adjustable heading bug is selectively positioned along the compass perimeter. It rotates with the compass. The relationship between the adjustable heading bug and the radial measurement indicia indicates a desired heading of the aircraft. The multi-controlled HSI also has a navigational aid radial/course indicator. The navigational aid radial/course indicator visually indicates a representation of a navigational aid signal, from any of the navigational sources previously discussed, or yet to be developed navigational system, and is positioned within the compass perimeter. The navigational aid radial/course indicator rotates with the compass in response to a change in the actual heading of the aircraft. In one embodiment utilizing a VOR navigational aid, the pilot selects the VOR station and then operates a radial/course selector to select one of the VOR radial signals emitted from the selected VOR station.

In another embodiment of the present invention, the captain yoke has a yoke heading adjustment control. The yoke heading adjustment control controls the position of the adjustable heading bug. In yet a further embodiment, the system has a yoke navigational aid radial/course selector. The yoke navigational aid radial/course selector controls the selection of the navigational aid radial signal displayed on the navigational aid radial/course indicator.

The yoke heading adjustment control and the yoke navigational aid radial/course selector generally allow the pilot move the adjustable heading bug and select the navigational aid radial signal at any time. In another embodiment of the instant invention, the system may have a mode selector which is a safety control designed to prevent unintentional operation of the yoke heading adjustment control and the yoke navigational aid radial/course selector. The mode selector has two modes. One mode is a heading bug mode. The other mode is a navigational aid radial/course mode. The heading bug mode facilitates operation between the yoke heading adjustment control and the adjustable heading bug. Similarly, prior to operating the yoke navigational aid radial/course selector, the navigational aid radial/course mode must be operated. The mode selector may be positioned at various locations on the flight deck within reach of the captain's seat.

In another embodiment of the instant invention, the system may have a yoke heading centering control that controls the position of the adjustable heading bug. The heading bug mode facilitates operation between the yoke heading centering control and the adjustable heading bug. The yoke heading centering control, the yoke heading adjustment control, and the yoke navigational aid radial/course selector, may be separate devices or be contained within a single unit. In another embodiment of the instant invention, the system may incorporate a first control unit. The first control unit interfaces the various components with an aircraft primary control system, particularly with the navigational aid devices, such as the multi-controlled HSI.

As is commonly known in the art, the flight deck may have a single seat, or the flight deck may have multiple seats. The seat on the left side of the flight deck is commonly referred to as the captain's seat, with the seat on the right side of the flight deck referred to as a right seat or a first officer's seat.

The instrument panel contains a first officer multi-controlled HSI. The first officer multi-controlled HSI has a first officer compass. The first officer compass has a first officer compass perimeter and a plurality of first officer radial measurement indicia that are located along the first officer compass perimeter. In another embodiment of the instant invention, the first officer multi-controlled HSI has a first officer adjustable heading bug. The first officer adjustable heading bug is in operable communication with a first officer heading adjustment control. A first officer navigational aid radial/course indicator visually indicates a representation of a first officer navigational aid radial or course selected by the pilot. The first officer navigational aid radial/course indicator is positioned within the first officer compass perimeter.

In one embodiment of the present invention, the first officer yoke has a first officer yoke heading adjustment control. The first officer yoke heading adjustment control controls the position of the first officer adjustable heading bug. In another embodiment, the instant invention has a first officer yoke navigational aid radial/course selector. The first officer yoke navigational aid radial/course selector controls selection of the first officer navigational aid signal, navigational radial, or navigational course. In another embodiment of the instant invention, the system may have a first officer mode selector which is a safety control designed to prevent unintentional operation of the first officer yoke heading adjustment control and the first officer yoke navigational aid selector. Similar to the mode selector, the first officer mode selector may have two modes. One mode is a first officer heading bug mode. The other mode is a first officer navigational aid radial/course mode.

The first officer heading bug mode facilitates operation between the first officer yoke heading adjustment control and the first officer adjustable heading bug. The first officer mode selector may be positioned at various locations on the flight deck within reach of the first officer's seat. The pilot may then quickly and easily select between the first officer heading bug mode and the first officer navigational aid radial/course mode.

In another embodiment of the instant invention, the system has a first officer yoke heading centering control that controls the position of the first officer adjustable heading bug. The first officer heading bug mode also facilitates operation between the first officer yoke heading centering control and the first officer adjustable heading bug. The first officer yoke heading centering control causes the first officer adjustable heading bug to move along the first officer compass perimeter and align with the first officer radial measurement indicia currently aligned with the first officer heading indicator. The first officer yoke heading centering control, the first officer yoke heading adjustment control, and the first officer yoke navigational aid radial/course selector, may be separate devices or be contained within a single unit.

In another embodiment with the flight deck with two seats, the system has a side control selector. The side control selector has a captain side selector and a first officer side selector. In this embodiment, the pilot may operate the selectors in combination with the controls and the mode selector to move the heading bug and the first officer heading bug.

In another similar embodiment of the instant invention, the aviation yoke HSI interface and flight deck control indicator and selector safety system further includes a first officer side control selector having a first officer captain side selector and a first officer copilot side selector. The operation of the first officer side control selector is similar to the side control selector. In one particular embodiment, the controls and the first officer controls may be integrated, into a single after-market component.

These variations, modifications, alternatives, and alterations of the various preferred embodiments may be used alone or in combination with one another, as will become more readily apparent to those with skill in the art with reference to the following detailed description of the preferred embodiments and the accompanying figures and drawings.

BRIEF DESCRIPTION OF THE DRAWINGS

Without limiting the scope of the present invention as claimed below and referring now to the drawings and figures:

DETAILED DESCRIPTION OF THE INVENTION

An aviation yoke HSI interface and flight deck control indicator and selector safety system (100) of the instant invention enables a significant advance in the state of the art. The preferred embodiments of the device accomplish this by new and novel arrangements of elements and methods that are configured in unique and novel ways and which demonstrate previously unavailable but preferred and desirable capabilities. The detailed description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

Figure 1:
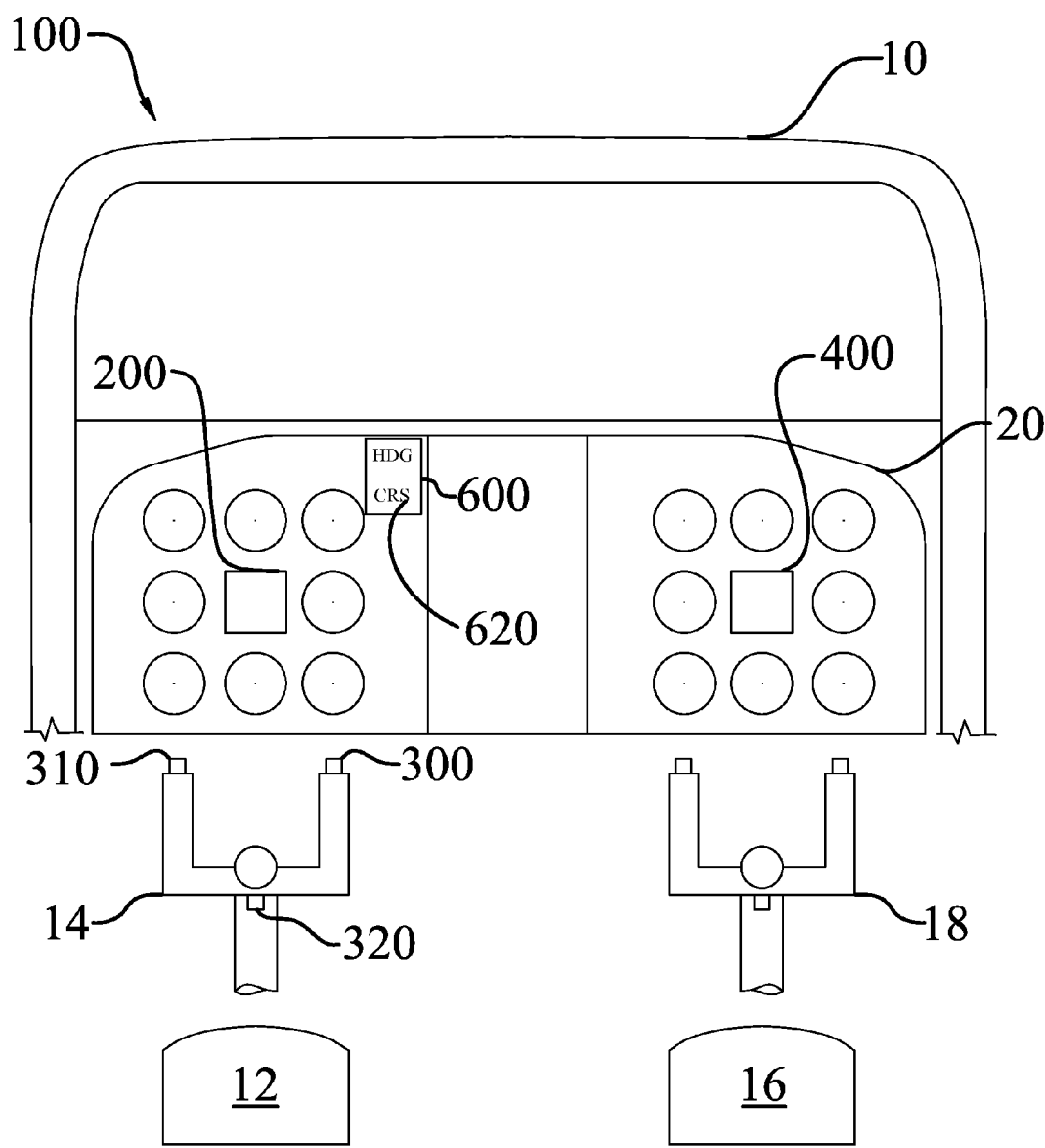
FIG. 1 is an embodiment of the present invention showing a flight deck having a captain's seat and a first officer's seat, not to scale.

One embodiment of the aviation yoke HSI interface and flight deck control indicator and selector safety system (100)

will be described first with reference to FIG. 1. A pilot may sit in a captain's seat (12) on a flight deck (10) of an aircraft, as is known in the art. By way of example, and not limitation, the aircraft may include prop-powered, as well as, jet-powered aircraft. In addition, the aircraft may be a helicopter. The pilot may grip a captain yoke (14) to adjust the altitude and attitude of the aircraft. Although a commonly used yoke design is shown in FIG. 1, one skilled in the art will observe that the captain yoke (14) may be a "stick" found in military aircraft or in helicopters, or collective lever, and are therefore generically referred to herein as a yoke. An instrument panel (20) contains a plurality of instruments for displaying flight critical information, such as an altimeter, an air speed indicator, a vertical speed indicator, an altitude director indicator (ADI), and turn-and-slip indicators, naming only some of the common instruments. As seen in FIG. 1, a multi-controlled HSI (200) is also located on the instrument panel (20).

Figure 2:
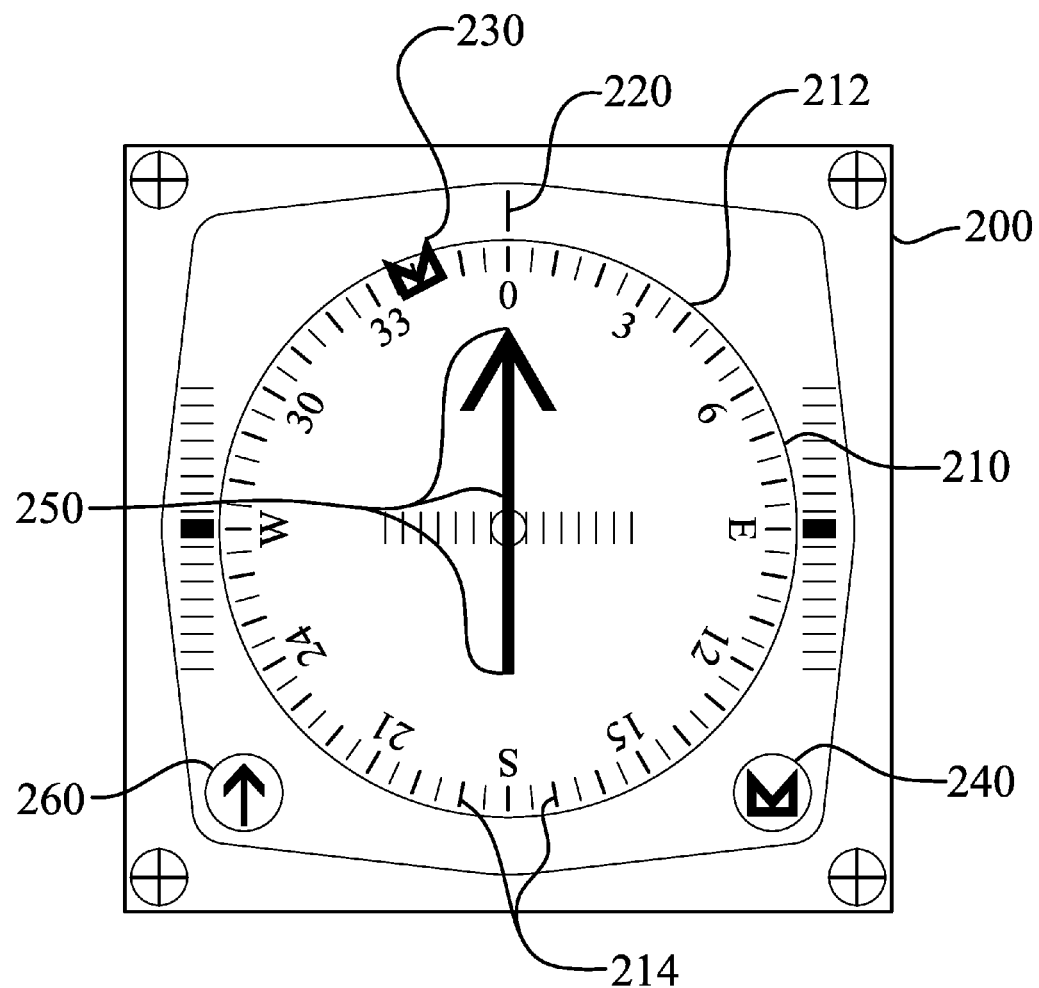
FIG. 2 is an embodiment of a multi-controlled HSI of the present invention, not to scale.

One embodiment of the multi-controlled HSI (200) is seen in FIG. 2. The multi-controlled HSI (200) has a compass (210), or simulated compass, that visually indicates an orientation of the earth's magnetic field. For one skilled in the art it is understood that any reference to compass herein also includes simulated compasses such would appear on an electronic display or projected image. Further, one skilled in the art will understand that a full compass need not be displayed at all times. In fact, only a portion of the compass may be displayed at any one time in what is referred to as "arc mode." The compass (210) rotates as the pilot banks the airplane away from the current direction. With continued reference to FIG. 2, the compass (210) has a compass perimeter (212) and a plurality of radial measurement indicia (214) that are located along the compass perimeter (212). An actual heading of the aircraft is determined by the alignment of a heading indicator (220), commonly referred to as a "lubber line," to the radial measurement indicia (214). For example, as seen in FIG. 2, the radial measurement indicia (214) are aligned with the heading indicator (220) at "0" degrees. Thus, the actual heading is "0" degrees, or due north.

With continue reference to FIG. 2, the multi-controlled HSI (200) has an adjustable heading bug (230). The adjustable heading bug (230) is in operable communication with a heading adjustment control (240), commonly referred to as a heading select knob. Operable communication means that when the heading adjustment control (240) is operated, the adjustable heading bug (230) moves in relation to the heading adjustment control (240). The heading adjustment control (240) may be a knob that rotates or another device that is capable of being manipulated with fingers and which causes the adjustable heading bug (230) to move.

The adjustable heading bug (230) is selectively positioned along the compass perimeter (212), as seen in FIG. 2. Thus, once the adjustable heading bug (230) is positioned along the compass perimeter (212) with respect to the radial measurement indicia (214), it rotates with the compass (210). The relationship between the adjustable heading bug (230) and the radial measurement indicia (214) indicates a desired heading of the aircraft. That is, the pilot moves the adjustable heading bug (230) along the radial measurement indicia (214) to the desired heading. Once the adjustable heading bug (230) is positioned, the pilot has a reminder of which direction the aircraft should be oriented. The adjustable heading bug (230) may be coupled to an autopilot or a flight director system, known in the art. When the autopilot is engaged, it may fly the aircraft to bring the desired heading into alignment with the heading indicator (220). For example, as seen in FIG. 2, the desired heading is 340 degrees as determined by the position of the adjustable heading bug (230) with respect to the radial measurement indicia (214). Therefore, knowing that the actual heading is 0 degrees and the desired heading is 340 degrees, the pilot knows to bank the aircraft left to bring the aircraft to the desired heading, thus bringing the adjustable heading bug (230) into alignment with the heading indicator (220). The multi-controlled HSI (200) also has a navigational aid radial/course indicator (250), named such because some of the navigational aids in communication with the present system are characterized by navigational aid signals that are transmitted from ground based stations such as conventional VOR stations, others from satellites, and others are internal to the aircraft such as gyro based systems. Therefore, a pilot may be following a predefined "radial" or "course" depending on the type of navigational aid and the indicator is accordingly referred to as the navigational aid radial/course indicator (250). The navigational aid in communication with the present system (100) may be any of the following: a VOR as previously discussed; LOC (localizer); LDA (Localizer Type Directional Aid); TACAN (Tactical Air Navigation); VORTAC (VHF Omni-Directional Tactical Air Navigation); GPS (Global Positioning System); INS (Inertial Navigation System); FMS (Flight Management System); MLS (Microwave Landing System); LORAN (Long Range Navigation-C); IRU (Internal Reference Units); WAAS (Wide Augmentation System); GLS (Global Landing System); TLS (Transponder Landing System); variations thereof and future navigational systems designed to provide a navigational aid to an HSI to aid a pilot in navigating the airways. To navigate using these navigational aids the pilot will select the desired radial or the desired course. Some of the afore mentioned navigational sources will automatically set the CDI on the HSI to a predetermined course that the pilot has selected and or entered, but some may require the pilot to do this manually, however some just indicate a suggested course that the pilot must then set. All of these navigational sources will be displayed on the CDI (Course Deviation Indicator) on the HSI. These sources may automatically set the CDI on the HSI to a predetermined course that the pilot has selected and or entered. The CDI will show the course on the HSI in respect to the navigational radial or course to be flown. This radial will be on a magnetic heading as displayed on the HSI. Such terms known to one skilled in the art and are described in the Federal Aviation Administration (FAA) Aeronautical Information Manual (AIM). The signal received by the present system (100) from any of the navigational aids just discussed is referred throughout as a navigational aid signal.

As is known in the art, in the past a VOR station was the primary navigation aid used by civil aviation and therefore much of the following description will describe the use of the system (100) when the navigational aid signal is effectively a VOR radial transmitted from a VOR station, however one skilled in the art will appreciate how a similar description applies equally to the numerous variations of navigational aids that may be in communication with the system (100). The VOR station is oriented to magnetic north and transmits azimuth information to the aircraft. The VOR station provides 360 courses, one for each degree, TO and FROM the VOR station. The 360 courses are referred to as VOR radial signals. Therefore, there are 360 VOR radial signals per VOR station. As seen in FIG. 2, when the navigational aid is a VOR station the navigational aid radial/course indicator (250) visually indicates a representation of the VOR radial signal and is positioned within the compass perimeter (212). The navigational aid radial/course indicator (250) rotates with the compass (210) in response to a change in the actual heading of the aircraft, thereby providing the pilot with a visual presentation of the orientation of the aircraft with respect to the VOR radial signal. The navigational aid radial/course indicator (250) may also translate along a course deviation scale within the compass perimeter (212) as the aircraft flies along the actual heading. In this example, the pilot selects the VOR station and then operates a radial/course selector (260), as seen in FIG. 2, to select one of the VOR radial signals emitted from the selected VOR station. The radial/course selector (260) is commonly referred to as a course select knob, or an omni-bearing selector (OBS) knob. One skilled in the art will appreciate that the same basic principle that is applied to the VOR station and signal is used for the plurality of other previously discussed navigational aids. The navigational aid radial/course indicator (250) is used to select the predetermined course for the multitude of navigational sources with may be received by an aircraft in a manner similar to that just discussed with respect to the VOR station.

While FIG. 2 shows the navigational aid radial/course indicator (250) as a unitary arrow, the navigational aid radial/course indicator (250) may have a number of component parts. By way of example and not limitation, the navigational aid radial/course indicator (250) may be comprised of (i) a course select pointer as represented by just the arrow head and (ii) a course deviation bar, or CDI, which is represented by the shaft of the arrow, as are known in the art.

As previously mentioned, the navigational aid radial/course indicator (250) may translate back and forth on the course deviation scale (the vertical hash lines in the center of FIG. 2), to visually depict the distance and the orientation that the aircraft is from the selected VOR radial signal, or course. In addition, the multi-controlled HSI (200) may have an aircraft symbol in a fixed position in the center of the multi-controlled HSI (200) in order to help the pilot visualize the orientation of the navigational aid with respect to the aircraft. Finally, the multi-controlled HSI (200) may have glide-slope deviation scales on each side, as seen in FIG. 2, and TO/FROM indicators (not shown) to indicate whether the aircraft is traveling toward or away from the selected navigational aid signal source.

Referring once again to FIG. 1, in one embodiment of the present invention, the captain yoke (14) has a yoke heading adjustment control (300). The yoke heading adjustment control (300) controls the position of the adjustable heading bug (230), seen in FIG. 2. By way of example and not limitation, the yoke heading adjustment control (300) may be a rheostat or potentiometer type control allowing the pilot to move the adjustable heading bug (230) clockwise or counterclockwise along the compass perimeter (212) to a new desired heading. While FIG. 1 illustrates the position of the yoke heading adjustment control (300) on the right side of the captain yoke (14), the yoke heading adjustment control (300) may be located anywhere on the captain yoke (14) that is easily accessible to one of the pilot's hands, particularly the pilot's fingers. By way of example and not limitation, the yoke heading adjustment control (300) may be a knob, roller ball, joystick, touch screen, or other control, preferably a control device sized to be operated by a single human digit, or between two digits. Placement of the yoke heading adjustment control (300) on the captain yoke (14) gives the pilot convenient and safe access to a control that allows the pilot to move the adjustable heading bug (230) without having to release the captain yoke (14) and reach forward to the instrument panel (20), or other remote location, to operate the heading adjustment control (240).

In another embodiment, with continued reference to FIG. 1, the system (100) has a yoke radial/course selector (310). The yoke radial/course selector (310) controls the selection of the navigational aid radial/course displayed on the navigational aid radial/course indicator (250).

Similar to the yoke heading adjustment control (300), the yoke radial/course selector (310) is positioned on the captain yoke (14). While FIG. 1 illustrates the position of the yoke radial/course selector (310) on the right side of the captain yoke (14), the yoke radial/course selector (310) may be located anywhere on the captain yoke (14), stick, collective, or other device that is easily accessible to one of the pilot's hands, particularly the pilot's fingers. The yoke heading adjustment control (300) may be positioned so that it is operated with, for example, the left hand, and the yoke radial/course selector (310) may be positioned on the opposite side of the captain yoke (14), as seen in FIG. 1, so that the yoke radial/course selector (310) may be operated with, for example, the right hand. As previously discussed with respect to the yoke heading adjustment control (300), and by way of example and not limitation, the yoke radial/course selector (310) may be a knob, roller ball, joystick, touch screen or other type of control that is preferably a control device sized to be operated by a single digit, or between two digits.

The yoke heading adjustment control (300) and the yoke radial/course selector (310) generally allow the pilot to move the adjustable heading bug (230) and select the navigational aid signal at any time. However, in another embodiment of the instant invention, and with continued reference to FIGS. 1 and 2, the system (100) may have a mode selector (600) which is a safety control designed to prevent unintentional operation of the yoke heading adjustment control (300) and the yoke radial/course selector (310). The mode selector (600) has two modes. One mode is a heading bug mode (610). The other mode is a radial/course mode (620). The heading bug mode (610) facilitates operation between the yoke heading adjustment control (300) and the adjustable heading bug (230), seen in FIG. 2. "Facilitates operation" means that prior to actually controlling the movement of the adjustable heading bug (230), the heading bug mode (610) must be operated, and, similarly, prior to operating the yoke radial/course selector (310), the radial/course mode (620) must be operated. For example, to change the displayed radial/course navigational aid with the yoke radial/course selector (310), the pilot must first activate the radial/course mode (620) followed by the yoke radial/course selector (310). Similarly, to operate the yoke heading adjustment control (300), the pilot must first activate the heading bug mode (610).

The mode selector (600) may be positioned at various locations on the flight deck (10) within reach of the captain's seat (12). For instance, the mode selector (600) may be located on the instrument panel (20), as seen in FIG. 1, or the mode selector (600) may be located on the captain yoke (14). The mode selector (600) may prevent the pilot from operating the yoke heading adjustment control (300) and the yoke radial/course selector (310) in tense or stressful situations. For example, one skilled in the art will observe and appreciate, that when flying an aircraft in poor weather, in a situation with poor visibility, particularly according to an instrument approach to a runway using an ILS (Instrument Landing System), or in heavy traffic, the pilot may become tense and focused on controlling the aircraft in response to a rapidly changing situation. The pilot may naturally grip the captain yoke (14) tightly while under stress. In this situation, since the yoke heading adjustment control (300) and the yoke radial/course selector (310) may be located on the captain yoke (14), the mode selector (600) prevents the pilot from inadvertently moving the adjustable heading bud (230) with the yoke heading adjustment control (300) or selecting a different navigational aid signal with the yoke radial/course selector (310).

In another particular embodiment of the instant invention, the mode selector (600) may be integrated into the yoke heading adjustment control (300) and the yoke radial/course selector (310). More specifically, the heading bug mode (610) may be integrated into the yoke heading adjustment control (300) and the radial/course mode (620) may be integrated into the yoke radial/course selector (310). Thus, by way of example only and not limitation, to operate the yoke heading adjustment control (300), the pilot may press and hold the yoke heading adjustment control (300) for a short period of time to operate the heading bug mode (610) which in turn facilitates operation of the yoke heading adjustment control (300). Similarly, to operate the yoke radial/course selector (310), the pilot may press and hold the yoke radial/course selector (310) to operate the radial/course mode (620) which in turn facilitates operation of the yoke radial/course selector (310). Other permutations of the press and hold scheme are possible. For example, having the modes (610, 620) reversed with the heading bug mode (610) integrated into the yoke radial/course selector (310) and the radial/course mode (620) integrated into the yoke heading adjustment control (300). In this configuration, in conjunction with the push-and-hold scheme, the pilot pushes and holds the yoke radial/course selector (310) with one hand, thus activating the heading bug mode (610) and facilitating the operation of the yoke heading adjustment control (300) with the other hand. Similarly, operation of the yoke heading adjustment control (300) with one hand would, in turn, facilitate operation of the yoke radial/course selector (310) with the other hand. Requiring this type of operation with both hands thus substantially eliminates the possibility of the pilot inadvertently moving the adjustable heading bug (230) or selecting an undesired navigational aid signal.

With continued reference to FIGS. 1 and 2, in another embodiment of the instant invention, the system (100) may have a yoke heading centering control (320) that controls the position of the adjustable heading bug (230). The heading bug mode (610) facilitates operation between the yoke heading centering control (320) and the adjustable heading bug (230). By way of example and not limitation, with a single operation, the yoke heading centering control (320) moves the adjustable heading bug (230) along the compass perimeter (212) to align with the radial measurement indicia (214) currently aligned with the heading indicator (220).

The yoke heading centering control (320) may also be positioned on the captain yoke (14). As with the other controls (300, 310) positioned on the captain yoke (14), the yoke heading centering control (320) allows the pilot to quickly adjust the desired heading of the aircraft without releasing the captain yoke (14). The yoke heading centering control (320) may be any one of a number of devices, such as a switch or a button. For example, when the yoke heading centering control (320) is a button, depressing it will move the adjustable heading bug (230) from its current location along the compass perimeter (212) to align with the radial measurement indicia (214) aligned with the heading indicator (220). In this manner then, the pilot may quickly and safely center the desired heading of the aircraft to the actual heading of the aircraft without releasing the captain yoke (14).

Figure 3:
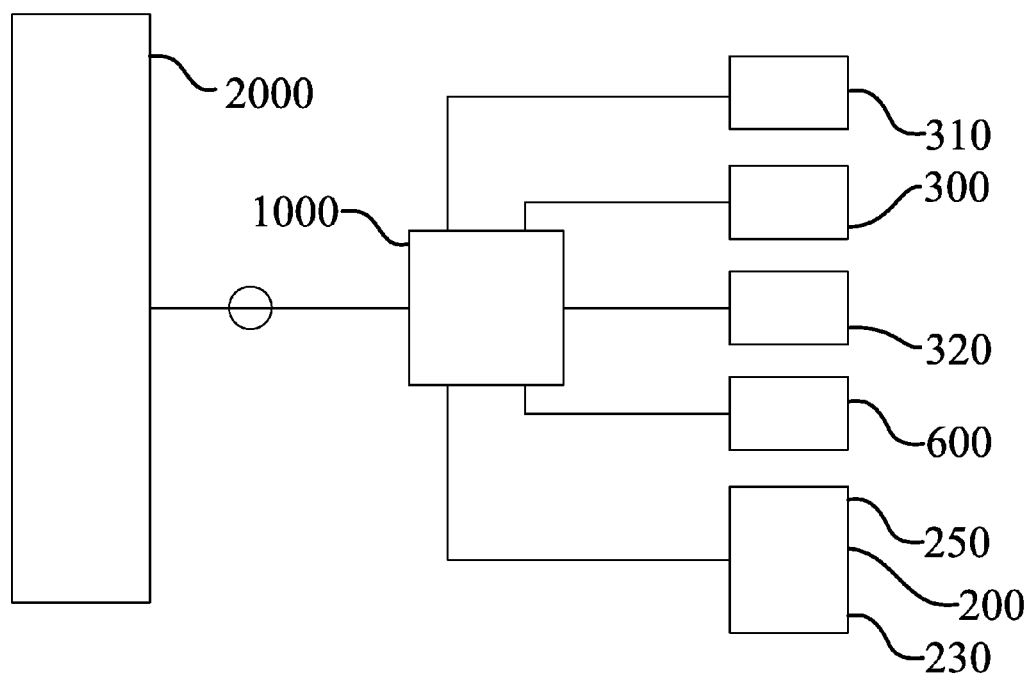
FIG. 3 is a schematic of an embodiment of the present invention having a first control unit, not to scale.

In another embodiment of the instant invention, the system (100) may incorporate a first control unit (1000), as seen in FIG. 3. The first control unit (1000) interfaces the various, previously described components with an aircraft primary control system (2000), seen in FIGS. 6 and 8, particularly with the navigational aid devices, such as the multi-controlled HSI (200). As seen in FIG. 3, the first control unit (1000) is in electrical communication with the multi-controlled HSI (200), the yoke heading adjustment control (300), the yoke radial/course selector (310), the yoke heading centering control (320), and the mode selector (600). Therefore, when the pilot operates the mode selector (600), the first control unit (1000) enables the adjustable heading bug (230) to move in response to operation of the yoke heading adjustment control (300). Similarly, the first control unit (1000) permits the yoke radial/course selector (310) to select the VOR radial signal and permits the yoke heading centering control (320) to control the adjustable heading bug (230). By way of example and not limitation, the system (100) may be either an aftermarket device that is simply connected to an aircraft's current control and power system, or the first control unit (1000) may be integrated into a current control system by the manufacturer of the control system. In other words, the first control unit (1000) may be a standalone control unit or integrated by the OEM.

Figure 4:
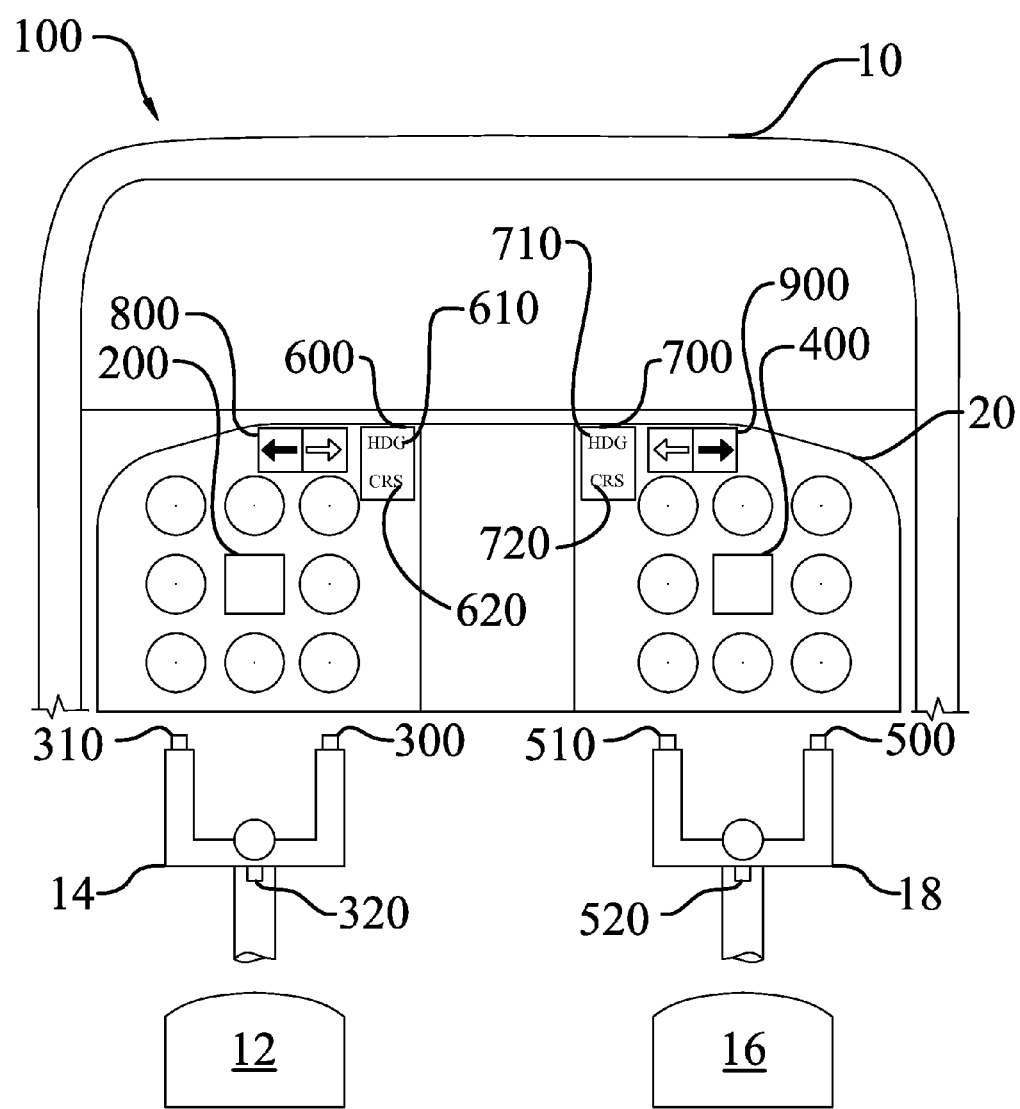
FIG. 4 is an embodiment of the present invention showing the flight deck having the captain's seat, the first officer's seat, a mode selector, and a first officer mode selector; not to scale.

As is commonly known in the art, the flight deck (10) may have a single seat or the flight deck (10) may have multiple seats. A common arrangement of the flight deck (10) is to have two seats arranged as shown in FIG. 4. The seat on the left side of the flight deck (10) is commonly referred to as the captain's seat (12) with the seat on the right side of the flight deck (10) referred to as a right seat or a first officer's seat (16). One skilled in the art will observe that the captain's seat (12) may sit in front of the first officer's seat (16) as is common in military flight training aircraft.

In the embodiment, as seen in FIG. 4, the term pilot refers not only to the captain but to others who are capable of flying the aircraft, such as a first officer or simply "FO." With continued reference to FIG. 4, the pilot may sit in the first officer's seat (16) and grip a first officer yoke (18). As with the embodiments described above, the system (100) permits the pilot to conveniently and safely modify the desired heading of the aircraft and permits the pilot to select the navigational aid, which may be a VOR radial signal or a course, while gripping the first officer yoke (18).

The controls and their functions accessible from the first officer's seat (16) may be similar to the previously described embodiments of the instant invention. However, as one skilled in the art will observe and appreciate, the controls need not be in the same position nor is it necessary that the same controls be available for each side.

Figure 5:
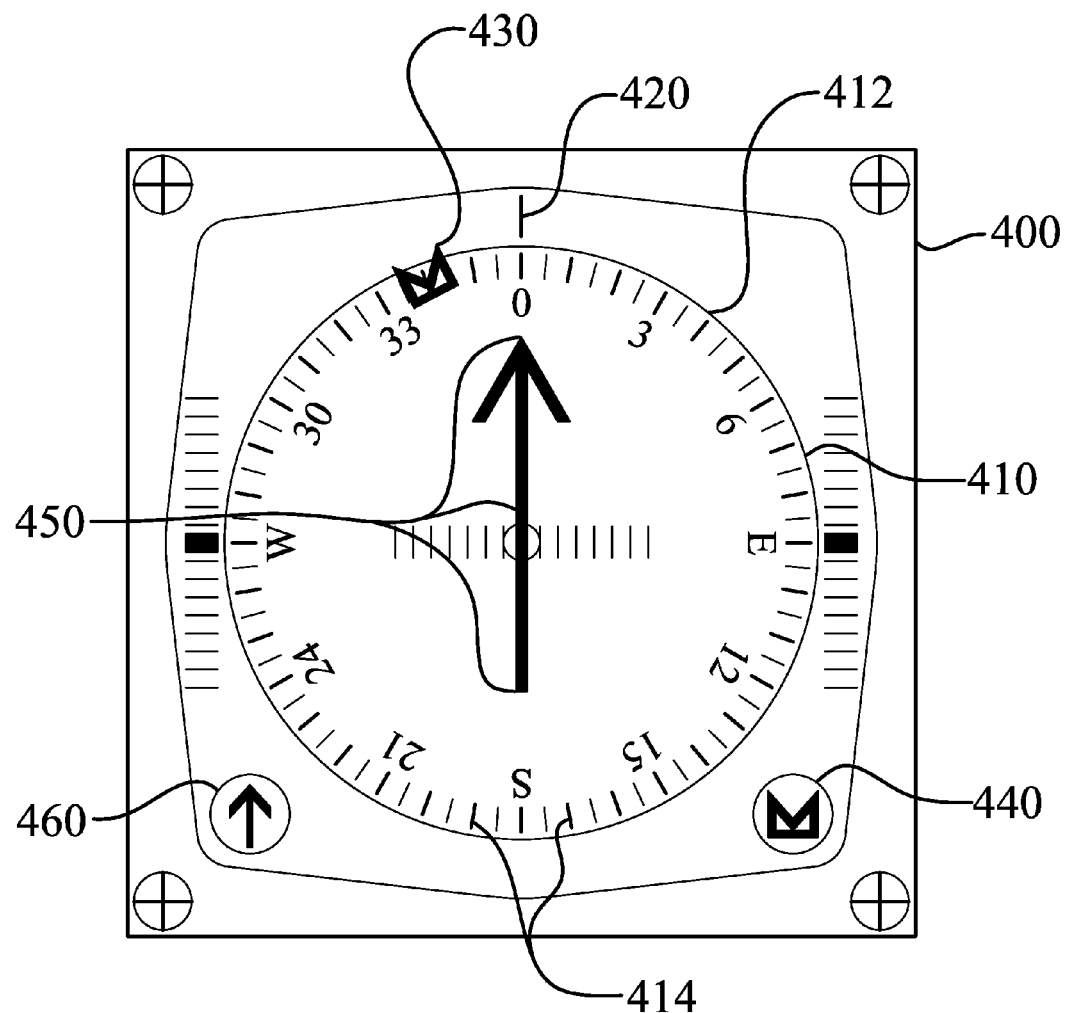
FIG. 5 is an embodiment of a first officer multi-controlled HSI of the present invention, not to scale.

With reference now to FIGS. 4 and 5, the instrument panel (20) contains a first officer multi-controlled HSI (400). The first officer multi-controlled HSI (400) has a first officer compass (410), seen only in FIG. 4, that visually indicates an orientation of the earth's magnetic field. The first officer compass (410) has a first officer compass perimeter (412) and a plurality of first officer radial measurement indicia (414) that are located along the first officer compass perimeter (412). The actual heading of the aircraft is determined by alignment of a first officer heading indicator (420), commonly called a "lubber line," to the most nearly aligned first officer radial measurement indicia (414). For example, as seen in FIG. 5, the first officer radial measurement indicia (414) are aligned with the first officer heading indicator (420) at "0" degrees, or due north.

With continued reference to FIG. 5, the first officer multi-controlled HSI (400) has a first officer adjustable heading bug (430). The first officer adjustable heading bug (430) is in operable communication with a first officer heading adjustment control (440). The first officer heading adjustment control (440) may be a knob that rotates or another device that is capable of being manipulated with fingers and that allows the pilot to move the first officer adjustable heading bug (430). The first officer adjustable heading bug (430) is selectively positioned along the first officer compass perimeter (412). Thus, as the first officer compass (410) rotates due to a change in the actual heading of the aircraft. The relationship between the first officer adjustable heading bug (430) and the first officer radial measurement indicia (414) indicates a first officer desired heading of the aircraft. That is, the pilot operates the first officer heading adjustment control (440) to move the first officer adjustable heading bug (430) along the first officer radial measurement indicia (414) to the first officer desired heading. One skilled in the art will observe and appreciate that the desired heading and the first officer desired heading need not be the same. The first officer multi-controlled HSI (400) also has a first officer navigational aid radial/course indicator (450).

As seen in FIG. 5, a first officer navigational aid radial/course indicator (450) visually indicates a representation of a first officer navigational aid, which may be a VOR radial signal or a course, selected by the pilot. Again, one skilled in the art will observe and appreciate that the first officer navigational aid and the navigational aid, which may be the VOR radial signal or course, need not be the same. The first officer navigational aid radial/course indicator (450) is positioned within the first officer compass perimeter (412). The first officer navigational aid radial/course indicator (450) rotates and may also translate along a course deviation scale within the first officer compass perimeter (412) as the aircraft flies along the actual heading. The pilot selects a first officer navigation aid signal source, which may be a VOR station, and then operates a first officer radial/course selector (460), as seen in FIG. 5, to, in this example, select one of the VOR radial signals emitted from the selected first officer navigational signal source, which in this example is the VOR station. The first officer radial/course selector (460) is commonly referred to as a course select knob, or an omnibearing selector (OBS) knob.

While FIG. 5 shows the first officer navigational aid radial/course indicator (450) as a unitary arrow, the first officer navigational aid radial/course indicator (450) may have a number of components. By way of example and not limitation, the first officer navigational aid radial/course indicator (450) may be comprised of (i) a course select pointer as represented by just the arrow head and (ii) a course deviation bar, or CDI, which is represented by the shaft of the arrow. As previously mentioned, the CDI may translate back and forth on the course deviation scale (the vertical hash lines in the center of FIG. 5), separate from the arrow head, to visually depict the distance and the orientation that the aircraft is from the selected navigation aid signal, which may be a VOR radial signal. In addition, the first officer multi-controlled HSI (400) may have an aircraft symbol in a fixed position in the center of the first officer multi-controlled HSI (400). Finally, the first officer multi-controlled HSI (400) may have glide-slope deviation scales on each side, as seen in FIG. 5, and TO/FROM indicators (not shown) to indicate whether the aircraft is traveling toward or away from the selected source of the navigation aid, such as a VOR station.

In one embodiment of the present invention, the first officer yoke (18), as seen in FIG. 4, has a first officer yoke heading adjustment control (500). The first officer yoke heading adjustment control (500) controls the position of the first officer adjustable heading bug (430). By way of example and not limitation, the first officer yoke heading adjustment control (500) may be a rheostat or potentiometer-type control allowing the pilot to move the first officer adjustable heading bug (430) clockwise or counterclockwise to a new heading. While FIG. 4 illustrates the position of the first officer yoke heading adjustment control (500) on the right side of the first officer yoke (18), the first officer yoke heading adjustment control (500) may be located anywhere on the first officer yoke (18) that is easily accessible to the pilot's hands, preferably the fingers, sometimes referred to as digits. By way of example and not limitation, the first officer yoke heading adjustment control (500) may be a knob, roller ball, joystick, touch screen, or other control preferably sized to be operated by a single digit or between two digits. Thus, the placement of the first officer yoke heading adjustment control (500) on the first officer yoke (18) gives the pilot convenient and safe access to the first officer yoke heading adjustment control (500) which allows the pilot to move the first officer adjustable heading bug (430) without having to release the first officer yoke (18) to operate the first officer heading adjustment control (440).

With continued reference to FIG. 4, another embodiment has a first officer yoke radial/course selector (510). The first officer yoke radial/course selector (510) controls selection of the first officer navigational aid signal, which may be a VOR radial signal. The first officer yoke radial/course selector (510) is positioned on the first officer yoke (18). The first officer yoke radial/course selector (510) may be positioned anywhere on the first officer yoke (18) from beside the first officer yoke heading adjustment control (500) so that it may be operated with the same hand, or the first officer yoke heading adjustment control (500) may be positioned on the first officer yoke (18), as seen in FIG. 4. As previously discussed with respect to the yoke heading adjustment control (300) and the yoke radial/course selector (310), and by way of example and not limitation, the first officer yoke heading adjustment control (500) and the first officer yoke radial/course selector (510) may be a knob, roller ball, joystick, touch screen, or other type of control that is preferably a control device sized to be operated by a single digit, or between two digits.

The first officer yoke heading adjustment control (500) and the first officer yoke radial/course selector (510) generally allow the pilot move the first officer adjustable heading bug (430) and select the first officer navigational aid signal, which may be a VOR radial signal, at any time. However, in another embodiment of the instant invention, and with continued reference to FIGS. 4 and 5, the system (100) may have a first officer mode selector (700). Similar to the mode selector (600), the first officer mode selector (700) may have two modes. One mode is a first officer heading bug mode (710). The other mode is a first officer radial/course mode (720). While both the mode selector (600) and the first officer mode selector (700) are seen in the embodiment shown in FIG. 4, there may be circumstances where one or the other, but not both, is installed.

The first officer heading bug mode (710) facilitates operation between the first officer yoke heading adjustment control (500), seen in FIG. 4, and the first officer adjustable heading bug (430), seen in FIG. 5. "Facilitates operation" means that prior to actually controlling the movement of the first officer adjustable heading bug (430), the first officer heading bug mode (710) must be operated which allows operation of the first officer yoke heading adjustment control (500), and prior to actually selecting the first officer VOR radial signal, the first officer radial/course mode (720) must be operated which allows operation of the first officer radial/course selector (510). Thus, to change the first officer navigational aid displayed, which may be the VOR radial signal or a course, with the first officer yoke radial/course selector (510), the pilot must first activate the first officer radial/course mode (720).

Similarly, to operate the first officer yoke heading adjustment control (500), the pilot must first activate the first officer heading bug mode (710).

The first officer mode selector (700) may be positioned at various locations on the flight deck (10) within reach of the first officer's seat (16). By way of example and not limitation, as seen in FIG. 4, the first officer mode selector (700) may be located on the instrument panel (20).

In another embodiment of the instant invention, the first officer mode selector (700) may be located on the first officer yoke (18).

In yet another particular embodiment of the instant invention, the first officer yoke radial/course mode (710) may be integrated into the first officer yoke heading adjustment control (500) and the first officer radial/course mode (720) may be integrated into the first officer yoke radial/course selector (510). Thus, by way of example only and not limitation, to operate the first officer yoke heading adjustment control (500), the pilot may press and hold the first officer yoke heading adjustment control (500) for a short period of time to enable the first officer heading bug mode (710) which in turn facilitates operation of the first officer yoke heading adjustment control (500). Similarly, to operate the first officer yoke radial/course selector (510), the pilot may press and hold the first officer yoke radial/course selector (510) to enable the first officer radial/course mode (720) which in turn facilitates operation of the first officer yoke radial/course selector (510). Other permutations of the press-and-hold scheme are possible.

With continued reference to FIGS. 4 and 5, in another embodiment of the instant invention, the system (100) has a first officer yoke heading centering control (520), seen in FIG. 4, that controls the position of the first officer adjustable heading bug (430), seen in FIG. 5. The first officer yoke heading centering control (520) is positioned on the first officer yoke (18), as seen in FIG. 4. The first officer heading bug mode (710) also facilitates operation between the first officer yoke heading centering control (520) and the first officer adjustable heading bug (430). The first officer yoke heading centering control (520), seen in FIG. 4, causes the first officer adjustable heading bug (430) to move along the first officer compass perimeter (412) and align with the first officer radial measurement indicia (414) currently aligned with the first officer heading indicator (420), seen in FIG. 5. As with the other controls (500, 510) positioned on the first officer yoke (18), the first officer yoke heading centering control (520) allows the pilot to quickly adjust the desired heading of the aircraft without releasing the first officer yoke (18). The first officer yoke heading centering control (520) may be any one of a number of devices, such as a switch or a button. For example, when the first officer yoke heading centering control (520) is a button, depressing it will move the first officer adjustable heading bug (430) from its current location along the first officer compass perimeter (412) to align with the first officer radial measurement indicia (414) aligned with the first officer heading indicator (420). In this manner then, the pilot may quickly and safely center the desired heading of the aircraft to the actual heading of the aircraft without releasing the first officer yoke (18).

Figure 6:
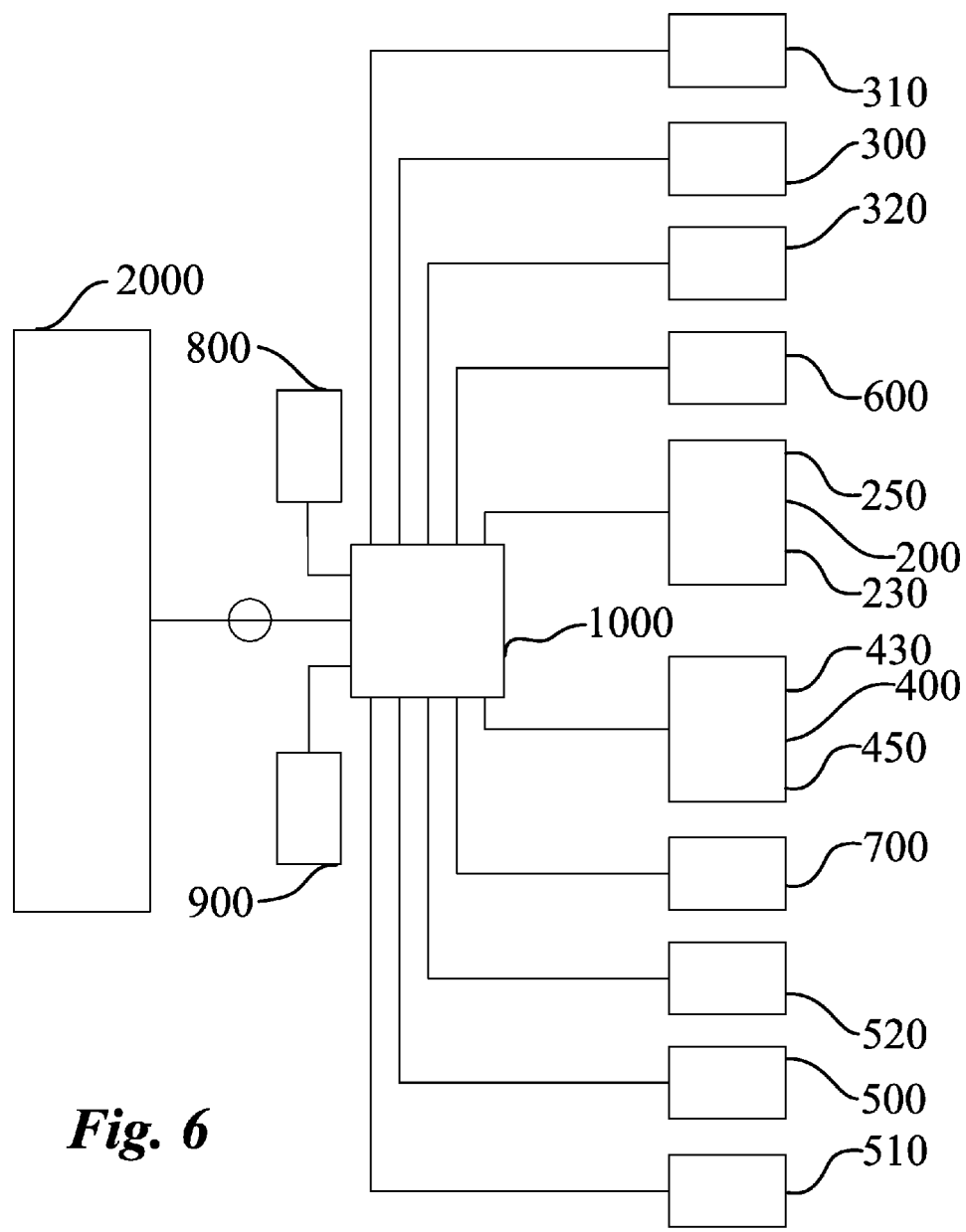
FIG. 6 is a schematic of an embodiment of the present invention having the first control unit for an embodiment of the present invention having the captain's seat and the first officer's seat, not to scale.

Referring now to FIG. 6, in another embodiment of the first control unit (1000), the previously described controls (300, 310, 320), the mode selector (600), the first officer controls (500, 510, 520), and the first officer mode selector (700) are in electrical communication with their respective multi-controlled HSIs (200, 400) through the first control unit (1000). In other words, with respect to the captain yoke (14), once operation is facilitated by operating the mode selector (600), the first control unit (1000) accepts control signals from the yoke heading adjustment control (300), the yoke radial/course selector (310), and the yoke heading centering control (320), and then the first control unit (1000) operates the adjustable heading bug (230) or the navigational aid radial/course indicator (250) accordingly.

Figure 8:
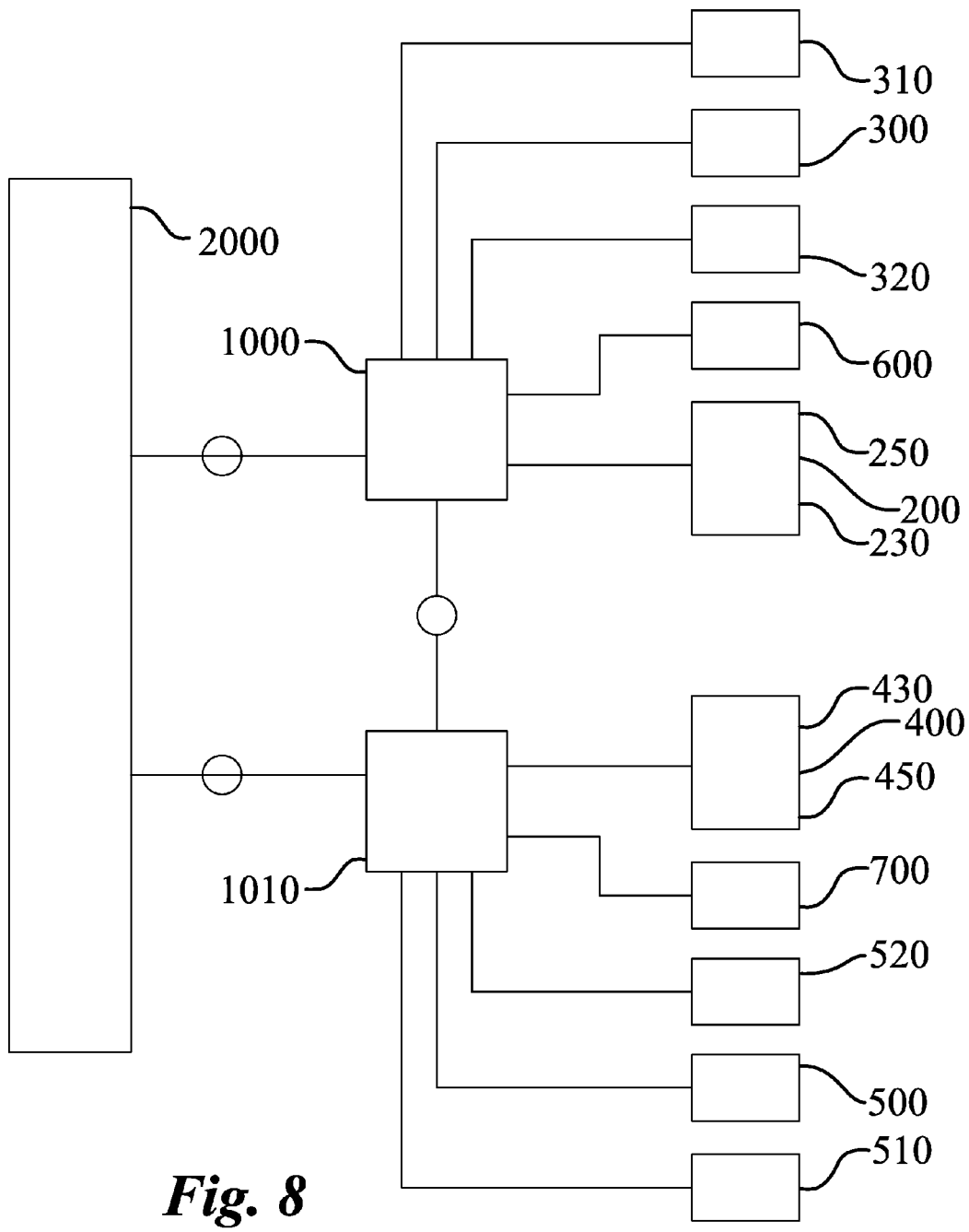
FIG. 8 is a schematic of an embodiment of the present invention having the first control unit and a second control unit for an embodiment of the present invention having the captain's seat and the first officer's seat, not to scale.

In a related embodiment, the system (100) incorporates a second control unit (1010) in electrical communication with the first control unit (1000) and the aircraft primary electronic system (2000), as seen in FIG. 8. The second control unit (1010) may serve as a duplicate system to the first control unit (1000). Therefore, in a situation where the first control unit (1000) fails, the second control unit (1010) will take over facilitating operation of the controls (300, 310, 320), the first officer controls (500, 510, 520), the mode selector (600), and the first officer mode selector (700).

With respect to the first officer yoke (18), the first control unit (1000) accepts control signals from the first officer mode selector (700) prior to facilitating operation of the first officer yoke heading adjustment control (500), the first officer yoke radial/course selector (510), and the first officer heading centering control (520). The first control unit (1000) operates the first officer adjustable heading bug (430) or the first officer navigational aid radial/course indicator (450) accordingly.

Figure 7:
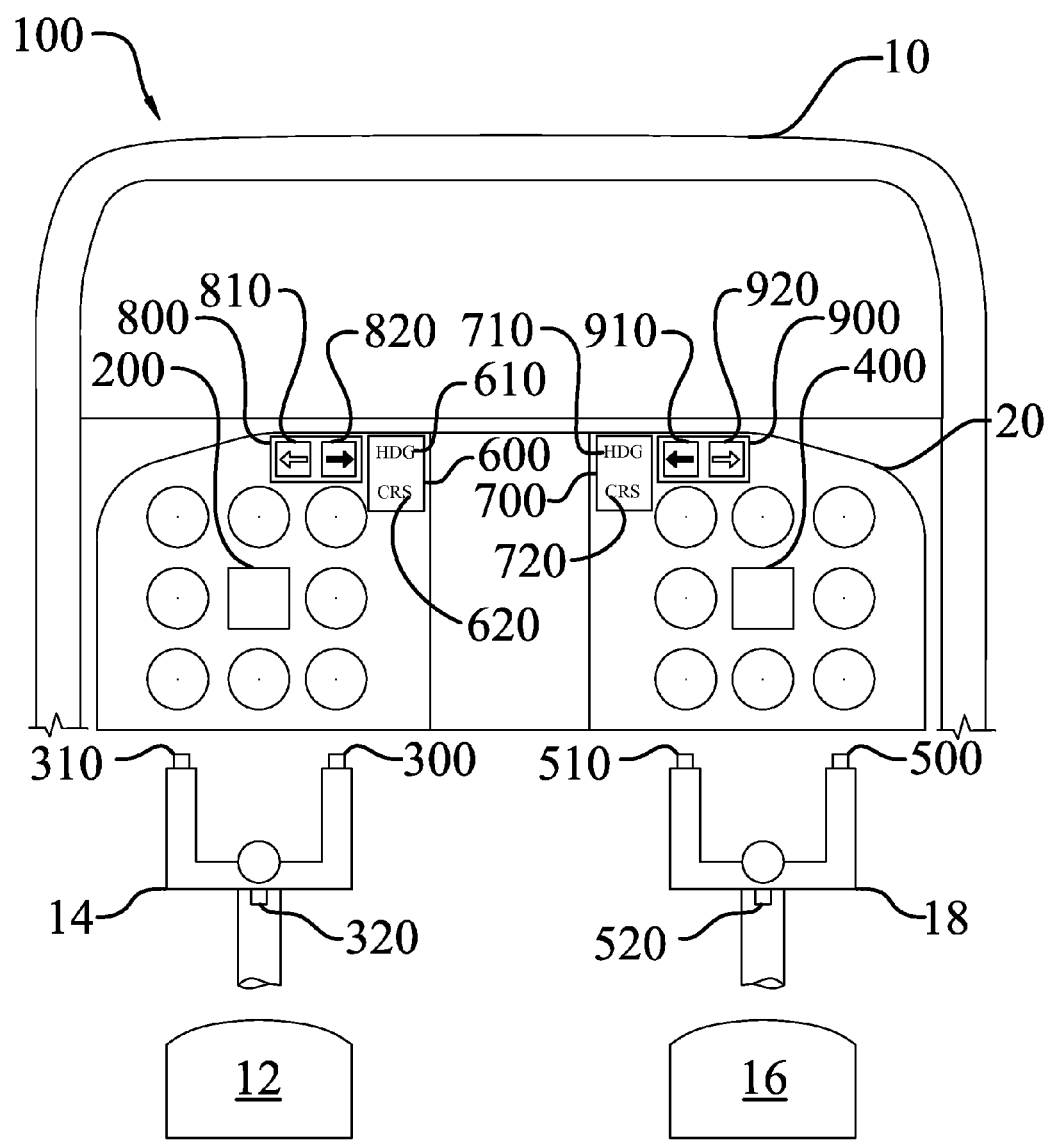
FIG. 7 is an embodiment of the present invention having a side control selector and a first officer side control selector, not to scale.

In another embodiment with the flight deck (10) with two seats, as seen in FIG. 7, the system (100) has a side control selector (800). As seen in FIG. 7, the side control selector (800) has a captain side selector (810) and a first officer side selector (820). In general the side control selector (800) permits the pilot to control aspects of the multi-controlled HSI (200) or the first officer multi-controlled HSI (400) from the captain's seat (12). In other words, the pilot may desire to operate a combination of certain aspects of the multi-controlled HSI (200) and the first officer multi-controlled HSI (400) from the captain's yoke (14), particularly with the yoke controls (300, 310, 320). This may be useful in situations where, for safety reasons, the pilot may not desire to release the yoke to change the desired heading or to select another VOR radial signal or course displayed by the HSIs (200, 400).

By way of example and not limitation, with reference to FIG. 7, the captain side selector (810) and the first officer side selector (820) are shown as buttons having an arrow shape. In one particular embodiment, the arrow shaped captain side selector (810) and the arrow shaped first officer side selector (820) light when the pilot presses on them. As one skilled in the art will observe and appreciate, the selectors (810, 820) may take other forms. In this embodiment, the pilot may operate the selectors (810, 820) in combination with the controls (300, 310, 320), and the mode selector (600) to move the heading bug (230) and the first officer heading bug (430). By way of example and not limitation, when the pilot first presses the captain side selector (810) and the heading bug mode (610), the pilot may then operate the yoke heading adjustment control (300) to move the adjustable heading bug (230) around the compass perimeter (212). Similarly, when the pilot operates the captain side selector (810) and the radial/course mode (620), the pilot may operate the yoke radial/course selector (310) to select the navigational aid radial or course, which may be a VOR radial signal, displayed by the navigational aid radial/course indicator (250). The pilot may operate the first officer side selector (820) in a similar manner.

With continued reference to FIG. 7, when the pilot presses the first officer side selector (820) and the heading bug mode (610), the pilot may then operate the yoke heading adjustment control (300) to move the first officer adjustable heading bug (430) around the first officer compass perimeter (412). The pilot may also select the navigational aid signal, which in some embodiments is a VOR radial signal, displayed by the first officer navigational aid radial/course indicator (450) by operating the first officer side selector (820) and the radial/course mode (620) and then selecting the navigational aid radial or course, often the VOR radial signal, by using the yoke radial/course selector (310). Numerous other combinations of the selector buttons (800) and other control are possible.

For example, the pilot may select a trio of the captain side selector (810), the first officer side selector (820), and the heading bug mode (610). Once the trio is selected, the pilot may move the adjustable heading bug (230) around the compass perimeter (212) and the first officer adjustable heading bug (430) around the first officer compass perimeter (412) by operating the yoke heading adjustment control (300). By way of example and not limitation the pilot may select a second trio of the captain side selector (810), the first officer side selector (820), and the radial/course mode (620). The pilot may then operate the yoke heading centering control (320) to select the navigational aid, which in one of many embodiments is a VOR radial signal, displayed by the navigational aid radial/course indicator (250) and the first officer navigational aid radial/course indicator (450).

In another similar embodiment of the instant invention, as seen in FIG. 7, the aviation yoke HSI interface and flight deck control indicator and selector safety system (100) further includes a first officer side control selector (900) having a first officer captain side selector (910) and a first officer copilot side selector (920). Therefore, when there are two pilots on the flight deck (10), the pilot sitting in the captain's seat (12), referred to as the captain, and the pilot sitting in the first officer's seat (16), referred to as a "FO," the FO may operate the first officer multi-controlled HSI (400) and the multi-controlled HSI (200). Again, for safety reasons, the captain may not want to release the captain yoke (14) to make adjustments to the course and the heading. In this situation, the captain may request the FO's assistance in moving the adjustable heading bug (230) and selecting the navigational aid signal, often a VOR radial, displayed by the navigational aid radial/course indicator (250).

By way of example and not limitation, as seen in FIG. 7, the first officer captain side selector (910) and the first officer copilot side selector (920) are shown as buttons having an arrow shape. In one particular embodiment, the arrow shaped first officer captain side selector (910) and the arrow shaped first officer copilot side selector (920) light, which provides a visual indication of which side of the flight deck (10) has control of which portion of the HSIs (200, 400), when the pilot presses on them. As one skilled in the art will observe and appreciate, the first officer selectors (910, 920) may take other forms. The operation of the first officer side control selector (900) is similar to the side control selector (800).

For example, the FO may press the first officer copilot side selector (920) and the first officer heading bug mode (710). The FO may then operate the first officer yoke heading adjustment control (500) to move the first officer adjustable heading bug (430) around the first officer compass perimeter (412). In a second combination, the FO may operate the first officer copilot side selector (920) and the first officer radial/course mode (720). The FO may then operate the first officer yoke radial/course selector (510) to select the navigational aid radial or course, which in come cases may be a VOR radial signal, displayed by the first officer navigational aid radial/course indicator (450). In a third combination, the FO may operate the first officer captain side selector (910) and the first officer heading bug mode (710) followed by operating the first officer yoke heading adjustment control (500). When the FO operates the first officer yoke heading adjustment control (500) the adjustable heading bug (230) moves around the compass perimeter (212) relieving the captain of the need to let go of one of the aircraft controls. In a fourth combination, the FO may operate the first officer captain side selector (910) and the first officer radial/course mode (720) such that by operating the first officer yoke radial/course selector (510) the FO selects the navigational aid, which may be a VOR radial signal, displayed by the navigational aid radial/course indicator (250) for the captain.

The FO may also operate the side selectors (910, 920) together with the first officer modes (710, 720). For example, the FO may push the first officer captain side selector (910), the first officer copilot side selector (920), and the first officer heading bug mode (710). With this combination the FO may operate the first officer yoke heading adjustment control (500) to move the adjustable heading bug (230) around the compass perimeter (212) and the first officer adjustable heading bug (430) around the first officer compass perimeter (412). Another example of a trio of buttons includes the first officer captain side selector (910), the first officer copilot side selector (920), and the first officer radial/course mode (720). By activating this trio, the FO may then operate the first officer yoke radial/course selector (510) to select the navigational aid, sometimes a VOR radial signal, displayed by the navigational aid radial/course indicator (250) and the first officer navigational aid radial/course indicator (450). As one skilled in the art will observe, for example, during takeoff, the FO may utilize the side selectors (910, 920) to adjust the adjustable heading bug (230) and select the navigational aid, which is often a VOR radial signal, displayed on the multi-controlled HSI (200) for the captain.

In a related embodiment, when the FO selects both side selectors (910, 920), the captain is unable to select either of the captain side selector (810) or the first officer side selector (820). Thus, the FO is able to prevent the captain from inadvertently making heading or course adjustments to the multi-controlled HSI (200) while the FO has control. In another embodiment, when the FO has selected both the first officer captain side selector (910) and the first officer copilot side selector (920), instead of locking out operation of the side control selector (800), as described above, operation of the side control selector (800) may cause the first officer side control selector (900) to automatically disengage. In another scenario, the mode selector (600) and the side control selector (800) may be thought of as being on a master side with the first officer mode selector (700) and the first officer side control selector (900), consequently, being on a slave side. Therefore, at any point in time, the captain may cause the first officer captain side selector (910) or the first officer copilot side selector (920) to disengage by selecting control of the same aspect of the multi-controlled HSI (200) or the first officer multi-controlled HSI (400).

Figure 9:
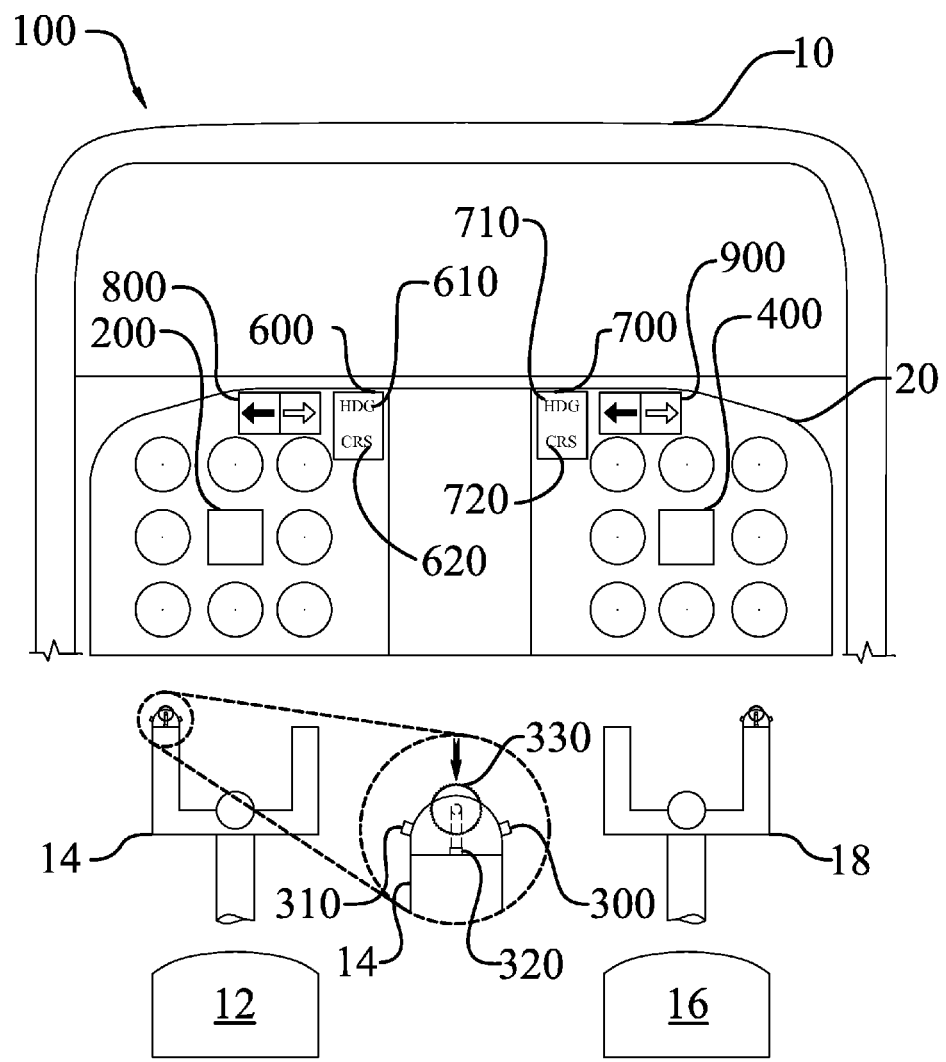
FIG. 9 is a schematic of an embodiment of the present invention having a yoke heading adjustment control, a yoke navigational aid radial/course selector, and a yoke heading centering control integrated into a single after-market component, not to scale.
Figure 10:
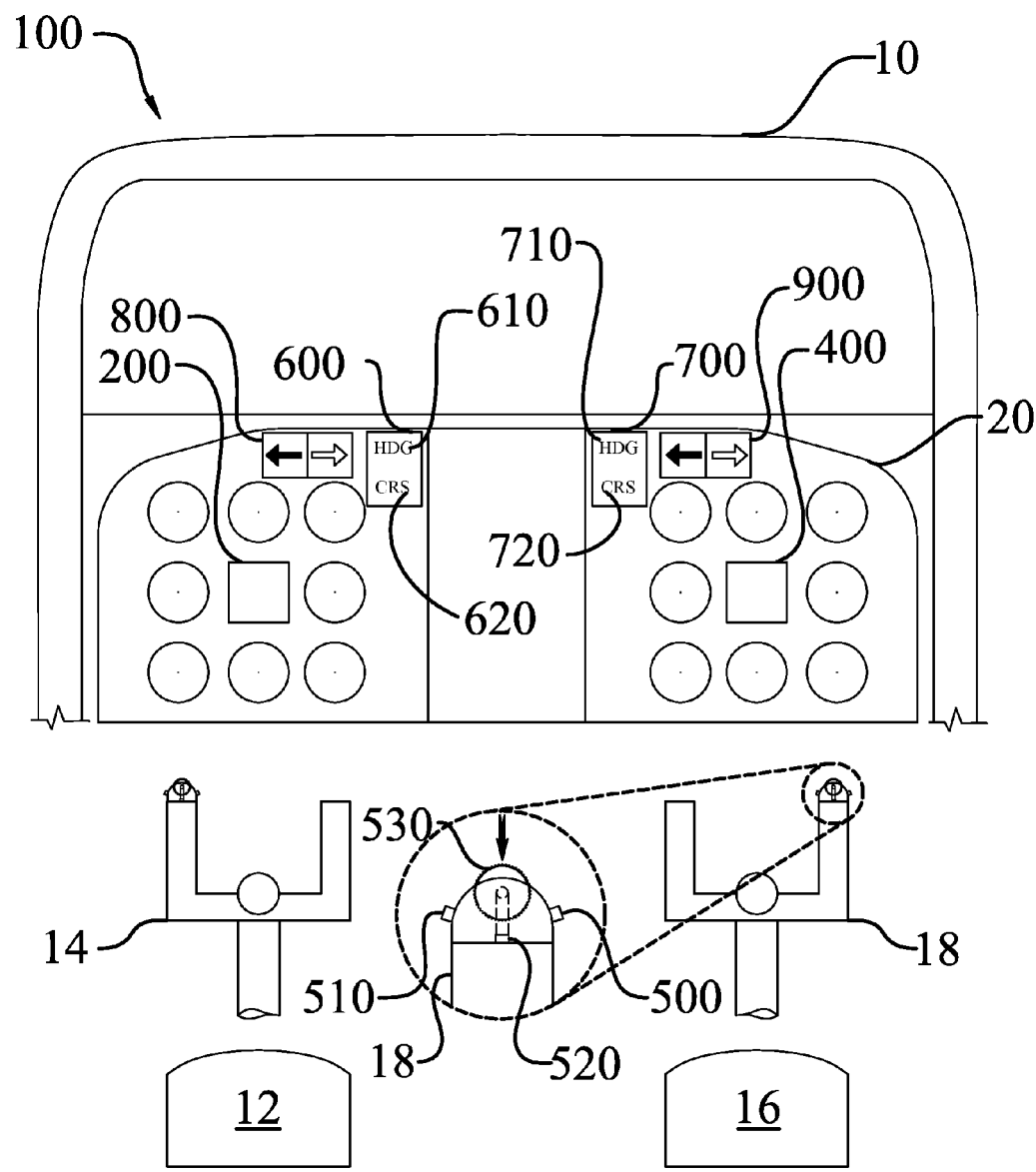
FIG. 10 is a schematic of an embodiment of the present invention having a first officer yoke heading adjustment control, a first officer yoke navigational aid radial/course selector, and a first officer yoke heading centering control integrated into a single after-market component.

By way of example and not limitation, the controls (300, 310, 320) and the first officer controls (500, 510, 520) may be integrated, as seen in FIGS. 9 and 10, and by way of example only, into a single after-market component. As seen in an exploded view found in FIG. 9, the controls (300, 310, 320) are buttons integrated into the after-market component. Thus, to activate the yoke heading adjustment control (300), the pilot presses the appropriate button. The pilot may then move the adjustable heading bug (230) around the compass perimeter (212) by rotating a scrolling control (330), as seen in FIG. 9. Similarly, the pilot may press the yoke radial/course selector (310) button and rotate the scrolling control (330) to select the navigational aid, often a VOR radial, displayed by the navigational aid radial/course indicator (250). As seen in FIG.

9, the yoke heading centering control (320) is positioned within the after-market component such that the pilot presses the scrolling control (330) to activate the yoke heading centering control (320). One skilled in the art will observe and realize that other arrangements of the controls (300, 310, 320) with or without the scrolling control (330) are possible.

The controls (300, 310, 320) may then be attached to the yoke (14) in a position where the pilot may operate each of the yoke heading adjustment control (300), the yoke radial/course selector (310), and the yoke heading centering control (320). In one particular embodiment, the after-market component having the controls (300, 310, 320) is located on the left portion of the captain yoke (14). Therefore, the pilot may continue to activate and operate the controls (300, 310, 320) with the left hand while operating a throttle with the right hand. In the present embodiment the pilot may activate the yoke heading adjustment control (300) and the yoke radial/course selector (310) simply by pressing the appropriate button. Further operation may require the pilot to move their finger in a side-to-side motion across the scrolling control (330).

With reference to FIG. 10, the first officer controls (500, 510, 520) may be positioned and operated in a similar manner. As one skilled in the art will observe and appreciate, modern aircraft yokes are loaded full of buttons and selector switches such that integrating the controls (300, 310, 320) and the first officer controls (500, 510, 520) may take may forms and is not limited to the form shown in FIGS. 9 and 10.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

I claim:

1. An aviation yoke HSI interface and flight deck control indicator and selector safety system (100) for allowing a pilot to sit in a seat (12) on a flight deck (10) of an aircraft, to grip a captain yoke (14), to observe an instrument panel (20), and to conveniently and safely modify a desired heading while gripping the captain yoke (14), comprising:
   (A) a multi-controlled HSI (200), having:
      (i) at least a portion of a compass (210) that visually indicates an orientation of the earth's magnetic field, wherein the at least a portion of a compass (210) has at least a portion of a compass perimeter (212) and a plurality of radial measurement indicia (214) that are located along the at least a portion of the compass perimeter (212), whereby the at least a portion of a compass (210) rotates in response to a change in an actual heading of the aircraft;
      (ii) a heading indicator (220) that visually indicates a fixed reference on the multi-controlled HSI (200), wherein the heading indicator (220) is located in readable relationship with the radial measurement indicia (214), whereby the actual heading of the aircraft is determined by assessing the relationship of the radial measurement indicia (214) with the heading indicator (220);
      (iii) an adjustable heading bug (230) that visually indicates the desired heading of the aircraft, wherein the adjustable heading bug (230) is selectively positioned along the at least a portion of the compass perimeter (212) such that the adjustable heading bug (230) rotates with the at least a portion of the compass (210), whereby the desired heading of the aircraft is determined by assessing the relationship of the adjustable heading bug (230) with the radial measurement indicia (214); and
   (B) a yoke heading adjustment control (300) that controls and moves the position of the adjustable heading bug (230), wherein the yoke heading adjustment control (300) is on the captain yoke (14), and operation of the yoke heading adjustment control (300) controls the movement of the adjustable heading bug (230) in a clockwise and counterclockwise direction along the at least a portion of the compass perimeter (212).

2. The aviation yoke HSI interface and flight deck control indicator and selector safety system (100) of claim 1, further including a yoke heading centering control (320) that controls and moves the position of the adjustable heading bug (230), wherein the yoke heading centering control (320) is on the captain yoke (14), and operation of the yoke heading centering control (320) moves the adjustable heading bug (230) in a clockwise and counterclockwise direction along the at least a portion of the compass perimeter (212) to align with the radial measurement indicia (214) currently aligned with the heading indicator (220).

3. The aviation yoke HSI interface and flight deck control indicator and selector safety system (100) of claim 1, further including:
   (A) a first officer multi-controlled HSI (400), having:
      (i) at least a portion of a first officer compass (410) that visually indicates an orientation of the earth's magnetic field, wherein the at least a portion of the first officer compass (410) has at least a portion of a first officer compass perimeter (412) and a plurality of first officer radial measurement indicia (414) that are located along the at least a portion of the first officer compass perimeter (412), whereby the at least a portion of the first officer compass (410) rotates in response to a change in the actual heading of the aircraft;
      (ii) a first officer heading indicator (420) that visually indicates a fixed reference on the first officer multi-controlled HSI (400), wherein the first officer heading indicator (420) is located in readable relationship with the first officer radial measurement indicia (414), whereby the actual heading of the aircraft is determined by assessing the relationship of the first officer radial measurement indicia (414) with the first officer heading indicator (420);
      (iii) a first officer adjustable heading bug (430) that visually indicates the desired heading of the aircraft, wherein the first officer adjustable heading bug (430) is selectively positioned along the at least a portion of the first officer compass perimeter (412) such that the first officer adjustable heading bug (430) rotates with the at least a portion of the first officer compass (410), whereby the desired heading of the aircraft is determined by assessing the relationship of the first officer adjustable heading bug (430) with the first officer radial measurement indicia (414); and (B) a first officer yoke heading adjustment control (500) that controls and moves the position of the first officer adjustable heading bug (430), wherein the first officer yoke heading adjustment control (500) is on a first officer yoke (18), and operation of the first officer yoke heading adjustment control (500) controls the movement of the first officer adjustable heading bug (430) in a clockwise and counterclockwise direction along the at least a portion of the first officer compass perimeter (412).

4. The aviation yoke HSI interface and flight deck control indicator and selector safety system (100) of claim 3, further including a first officer yoke heading centering control (520) that controls and moves the position of the first officer adjustable heading bug (430), wherein the first officer yoke heading centering control (520) is on the first officer yoke (18), and operation of the first officer yoke heading centering control (520) moves the first officer adjustable heading bug (430) in a clockwise and counterclockwise direction along the at least a portion of the first officer compass perimeter (412) to align with the first officer radial measurement indicia (414) currently aligned with the first officer heading indicator (420).

5. The aviation yoke HSI interface and flight deck control indicator and selector safety system (100) of claim 3, further including a side control selector (800) having a captain side selector (810) and a first officer side selector (820), wherein the side control selector (800) is in electrical communication with the multi-controlled HSI (200), the yoke heading adjustment control (300), the yoke heading centering control (320), the first officer multi-controlled HSI (400), the first officer yoke heading adjustment control (500), and the first officer yoke heading centering control (520), whereby (i) operation of the captain side selector (810) facilitates operation of the yoke heading adjustment control (300) to control the movement of the adjustable heading bug (230) in a clockwise and counterclockwise direction along the at least a portion of the compass perimeter (212);

(ii) operation of the first officer side selector (820) facilitates operation of the yoke heading adjustment control (300) to control the movement of the first officer adjustable heading bug (430) in a clockwise and counterclockwise direction along the at least a portion of the first officer compass perimeter (412); and (iii) operation of the captain side selector (810) and the first officer side selector (820) facilitates operation of the yoke heading adjustment control (300) to control the movement of the adjustable heading bug (230) in a clockwise and counterclockwise direction along the at least a portion of the compass perimeter (212) and the first officer adjustable heading bug (430) in a clockwise and counterclockwise direction along the at least a portion of the first officer compass perimeter (412).

6. The aviation yoke HSI interface and flight deck control indicator and selector safety system (100) of claim 5, wherein the side control selector (800) is positioned on the captain yoke (14).

7. The aviation yoke HSI interface and flight deck control indicator and selector safety system (100) of claim 5, further including a first officer side control selector (900) having a first officer captain side selector (910) and a first officer copilot side selector (920), wherein the first officer side control selector (900) is in electrical communication with the multi-controlled HSI (200), the yoke heading adjustment control (300), the yoke heading centering control (320), the first officer multi-controlled HSI (400), the first officer yoke heading adjustment control (500), and the first officer yoke heading centering control (520), whereby (i) operation of the first officer copilot side selector (920) facilitates operation of the first officer yoke heading adjustment control (500) to control the movement of the first officer adjustable heading bug (430) in a clockwise and counterclockwise direction along the at least a portion of the first officer compass perimeter (412);

(ii) operation of the first officer captain side selector (910) facilitates operation of the first officer yoke heading adjustment control (500) to move the adjustable heading bug (230) in a clockwise and counterclockwise direction along the at least a portion of the compass perimeter (212); and (iii) operation of the first officer captain side selector (910) and the first officer copilot side selector (920) facilitates operation of the first officer yoke heading adjustment control (500) to control the movement of the adjustable heading bug (230) in a clockwise and counterclockwise direction along the at least a portion of the compass perimeter (212) and the first officer adjustable heading bug (430) in a clockwise and counterclockwise direction along the at least a portion of the first officer compass perimeter (412).

8. The aviation yoke HSI interface and flight deck control indicator and selector safety system (100) of claim 7, wherein the first officer side control selector (900) is positioned on the captain yoke (14).

9. The aviation yoke HSI interface and flight deck control indicator and selector safety system (100) of claim 7, further including a first control unit (1000) in electrical communication with:

(i) the multi-controlled HSI (200) and the yoke heading adjustment control (300); and (ii) the first officer multi-controlled HSI (400) and the first officer yoke heading adjustment control (500), wherein the first control unit (1000) facilitates operation between:

(a) the multi-controlled HSI (200) and the yoke heading adjustment control (300); and (b) the first officer multi-controlled HSI (400) and the first officer yoke heading adjustment control (500).

10. The aviation yoke HSI interface and flight deck control indicator and selector safety system (100) of claim 7, further including a first control unit (1000) and a second control unit (1010), wherein (A) the first control unit (1000) is in electrical communication with the multi-controlled HSI (200), the yoke heading adjustment control (300), and the second control unit (1010), wherein the first control unit (1000) facilitates operation between the multi-controlled HSI (200) and the yoke heading adjustment control (300); and (B) the second control unit (1010) is in electrical communication with the first officer multi-controlled HSI (400) and the first officer yoke heading adjustment control (500), wherein the second control unit (1010) facilitates operation between the first officer multi-controlled HSI (400) and the first officer yoke heading adjustment control (500).

11. An aviation yoke HSI interface and flight deck control indicator and selector safety system (100) for allowing a pilot to sit in a seat (12) on a flight deck (10) of an aircraft, to grip a captain yoke (14), to observe an instrument panel (20), and to conveniently and safely select a radial/course while gripping the captain yoke (14), comprising:

(A) a multi-controlled HSI (200), having:
  (i) at least a portion of a compass (210) that visually indicates an orientation of the earth's magnetic field, wherein the at least a portion of the compass (210) has at least a portion of a compass perimeter (212) and a plurality of radial measurement indicia (214) that are located along the at least a portion of the compass perimeter (212), whereby the at least a portion of the compass (210) rotates in response to a change in an actual heading of the aircraft;
  (ii) a navigational aid radial/course indicator (250) that visually indicates a representation of the radial/course, wherein the navigational aid radial/course indicator (250) is positioned within the at least a portion of the compass perimeter (212), whereby the navigational aid radial/course indicator (250) rotates with the at least a portion of the compass (210) in response to a change in the actual heading of the aircraft, and the navigational aid radial/course indictor (250) translates within the at least a portion of the compass perimeter (212) as the aircraft flies along the actual heading; and
(B) a yoke radial/course selector (310) and a dashboard radial/course selector (260) that each control the selection of the radial/course indicated by the navigational aid radial/course indicator (250), wherein the yoke radial/course selector (310) is on the captain yoke (14), and operation of the yoke radial/course selector (310) controls the selection and display of the radial/course displayed by the navigational aid radial/course indicator (250).

12. The aviation yoke HSI interface and flight deck control indicator and selector safety system (100) of claim 11, further including:

(A) a first officer multi-controlled HSI (400), having:
  (i) at least a portion of a first officer compass (410) that visually indicates an orientation of the earth's magnetic field, wherein the at least a portion of the first officer compass (410) has at least a portion of a first officer compass perimeter (412) and a plurality of first officer radial measurement indicia (414) that are located along the at least a portion of the first officer compass perimeter (412), whereby the at least a portion of the first officer compass (410) rotates in response to a change in the actual heading of the aircraft;
  (ii) a first officer navigational aid radial/course indicator (450) that visually indicates a representation of the radial/course, wherein the first officer navigational aid radial/course indicator (450) is positioned within the at least a portion of the first officer compass perimeter (412), whereby the first officer navigational aid radial/course indicator (450) rotates with the at least a portion of the first officer compass (410) in response to a change in the actual heading of the aircraft, and the first officer navigational aid radial/course indictor (450) translates within the at least a portion of the first officer compass perimeter (412) as the aircraft flies along the actual heading; and
(B) a first officer yoke radial/course selector (510) that controls selection of the radial/course indicated by the first officer navigational aid radial/course indicator (450), wherein the first officer yoke radial/course selector (510) is on the first officer yoke (18), and operation of the first officer yoke radial/course selector (510) controls the selection and display of the radial/course displayed by the first officer navigational aid radial/course indicator (450).

13. The aviation yoke HSI interface and flight deck control indicator and selector safety system (100) of claim 12, further including a side control selector (800) having a captain side selector (810) and a first officer side selector (820), wherein the side control selector (800) is in electrical communication with the multi-controlled HSI (200), the yoke radial/course selector (310), the first officer multi-controlled HSI (400), and the first officer yoke radial/course selector (510), whereby
  (i) operation of the captain side selector (810) facilitates operation of the yoke radial/course selector (310) to select the navigational aid radial/course displayed by the navigational aid radial/course indicator (250);
  (ii) operation of the first officer side selector (820) facilitates operation of the yoke radial/course selector (310) to select the radial/course displayed by the first officer navigational aid radial/course indicator (450); and
  (iii) operation of the captain side selector (810) and the first officer side selector (820) facilitates operation of the yoke radial/course selector (310) to select the radial/course displayed by the navigational aid radial/course indicator (250) and the first officer navigational aid radial/course indicator (450).

14. The aviation yoke HSI interface and flight deck control indicator and selector safety system (100) of claim 13, further including a first officer side control selector (900) having a first officer captain side selector (910) and a first officer copilot side selector (920), wherein the first officer side control selector (900) is in electrical communication with the multi-controlled HSI (200), the yoke radial/course selector (310), the first officer multi-controlled HSI (400), and the first officer yoke radial/course selector (510), whereby
  (i) operation of the first officer copilot side selector (920) facilitates operation of the first officer yoke radial/course selector (510) to select the radial/course displayed by the first officer navigational aid radial/course indicator (450);
  (ii) operation of the first officer captain side selector (910) facilitates operation of the first officer yoke radial/course selector (510) to select the radial/course displayed by the navigational aid radial/course indicator (250); and
  (iii) operation of the first officer captain side selector (910) and the first officer copilot side selector (920) facilitates operation of the first officer yoke radial/course selector (510) to select the radial/course displayed by the navigational aid radial/course indicator (250) and the first officer navigational aid radial/course indicator (450).

15. The aviation yoke HSI interface and flight deck control indicator and selector safety system (100) of claim 14, further including a first control unit (1000) in electrical communication with:
  (i) the multi-controlled HSI (200) and the yoke radial/course selector (310); and
  (ii) the first officer multi-controlled HSI (400) and the first officer yoke radial/course selector (510), wherein the first control unit (1000) facilitates operation between:
    (a) the multi-controlled HSI (200) and the yoke radial/course selector (310); and
    (b) the first officer multi-controlled HSI (400) and the first officer yoke radial/course selector (510).

16. The aviation yoke HSI interface and flight deck control indicator and selector safety system (100) of claim 11, wherein the radial/course selected by the yoke radial/course selector (310) is a VOR radial signal from a VOR station.

17. The aviation yoke HSI interface and flight deck control indicator and selector safety system (100) of claim 11, wherein the radial/course selected by the yoke radial/course selector (310) is a course selected from a GPS-based navigational.

\* \* \* \* \*